(12) United States Patent
Kato et al.

(10) Patent No.: US 10,108,360 B2
(45) Date of Patent: Oct. 23, 2018

(54) APPARATUS AND METHOD TO REDUCE A RESPONSE TIME FOR WRITING DATA TO REDUNDANT STORAGE DEVICES BY DETECTING COMPLETION OF DATA-WRITING TO AT LEAST ONE DRIVER BEFORE ELAPSE OF A RETRY-OVER TIME

(71) Applicant: FUJITSU LIMITED, Kawasaki-shi, Kanagawa (JP)

(72) Inventors: Norihito Kato, Yokohama (JP); Norichika Imamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/450,289

(22) Filed: Mar. 6, 2017

(65) Prior Publication Data
US 2017/0277456 A1 Sep. 28, 2017

(30) Foreign Application Priority Data

Mar. 24, 2016 (JP) .................................. 2016-060947

(51) Int. Cl.
*G06F 13/00* (2006.01)
*G06F 3/06* (2006.01)
(Continued)

(52) U.S. Cl.
CPC ............ *G06F 3/0619* (2013.01); *G06F 3/065* (2013.01); *G06F 3/067* (2013.01); *G06F 11/2089* (2013.01); *G06F 17/30088* (2013.01)

(58) Field of Classification Search
CPC ........ G06F 3/0619; G06F 3/067; G06F 3/065; G06F 17/30088; G06F 11/2089
(Continued)

(56) References Cited

U.S. PATENT DOCUMENTS 9,430,485 B2 * 8/2016 Kato .................... G06F 11/1446
2006/0112251 A1 * 5/2006 Karr ........................ G06F 3/061
711/170

(Continued)

FOREIGN PATENT DOCUMENTS

| JP | 2000-132413 | 5/2000 |
| JP | 2001-5683 | 1/2001 |
| JP | 2009-223702 | 10/2009 |

*Primary Examiner* — Hong C Kim
(74) *Attorney, Agent, or Firm* — Staas and Halsey LLP

(57) ABSTRACT

Upon receiving, from application software, a first request for writing data stored in a first storage-region of the application software, an apparatus acquires a second storage-region, and copies the data to the second storage-region. The apparatus transmits, to one of drivers associated with each of redundant storage-devices on which mirroring is to be performed, a second request for writing the copied data to the each redundant storage-device, transmits, to the application software, a response indicating that writing of the data has been successfully performed in a case where a data-writing process for at least one of the redundant storage-devices is completed when a predetermined time has elapsed after the second request is transmitted to the drivers and before a retry-over time at which retry of the data-writing process is performed predetermined times, and excludes, from the redundant storage-devices, a storage-device for which the data-writing process is not completed.

6 Claims, 17 Drawing Sheets

(51) Int. Cl.
    *G06F 11/20*    (2006.01)
    *G06F 17/30*    (2006.01)
(58) Field of Classification Search
    USPC .......................................... 711/162, 161, 112
    See application file for complete search history.

(56) References Cited

U.S. PATENT DOCUMENTS

2009/0235110 A1    9/2009    Kurokawa
2014/0098822 A1*   4/2014    Galles ................... H04L 49/208
                                                          370/412
2014/0172802 A1*   6/2014    Kato ................. G06F 17/30088
                                                          707/639
2016/0239210 A1*   8/2016    Patocka .................. G06F 3/065

* cited by examiner

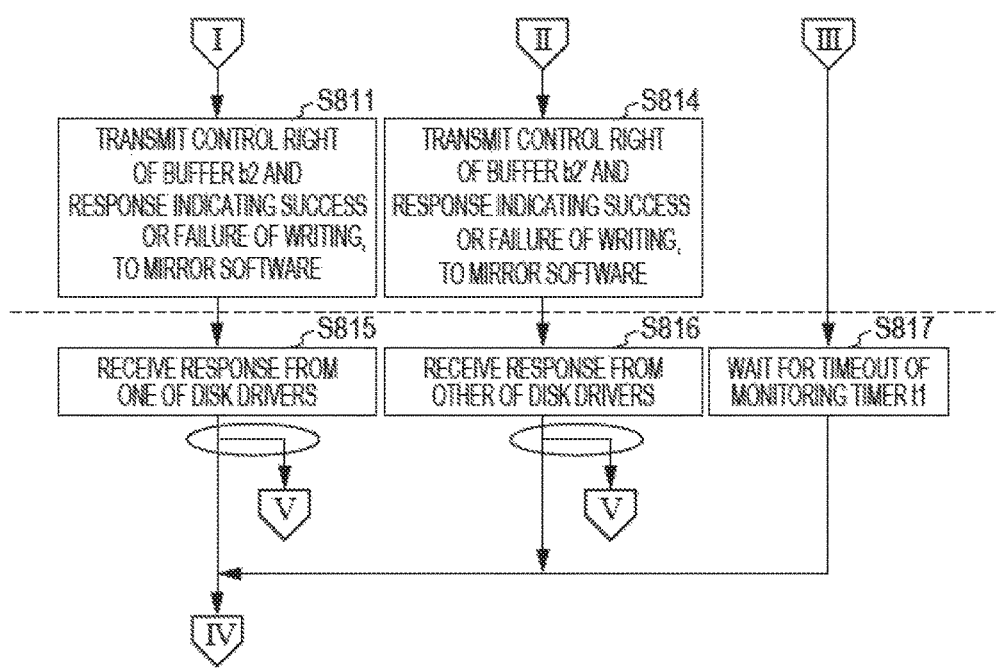

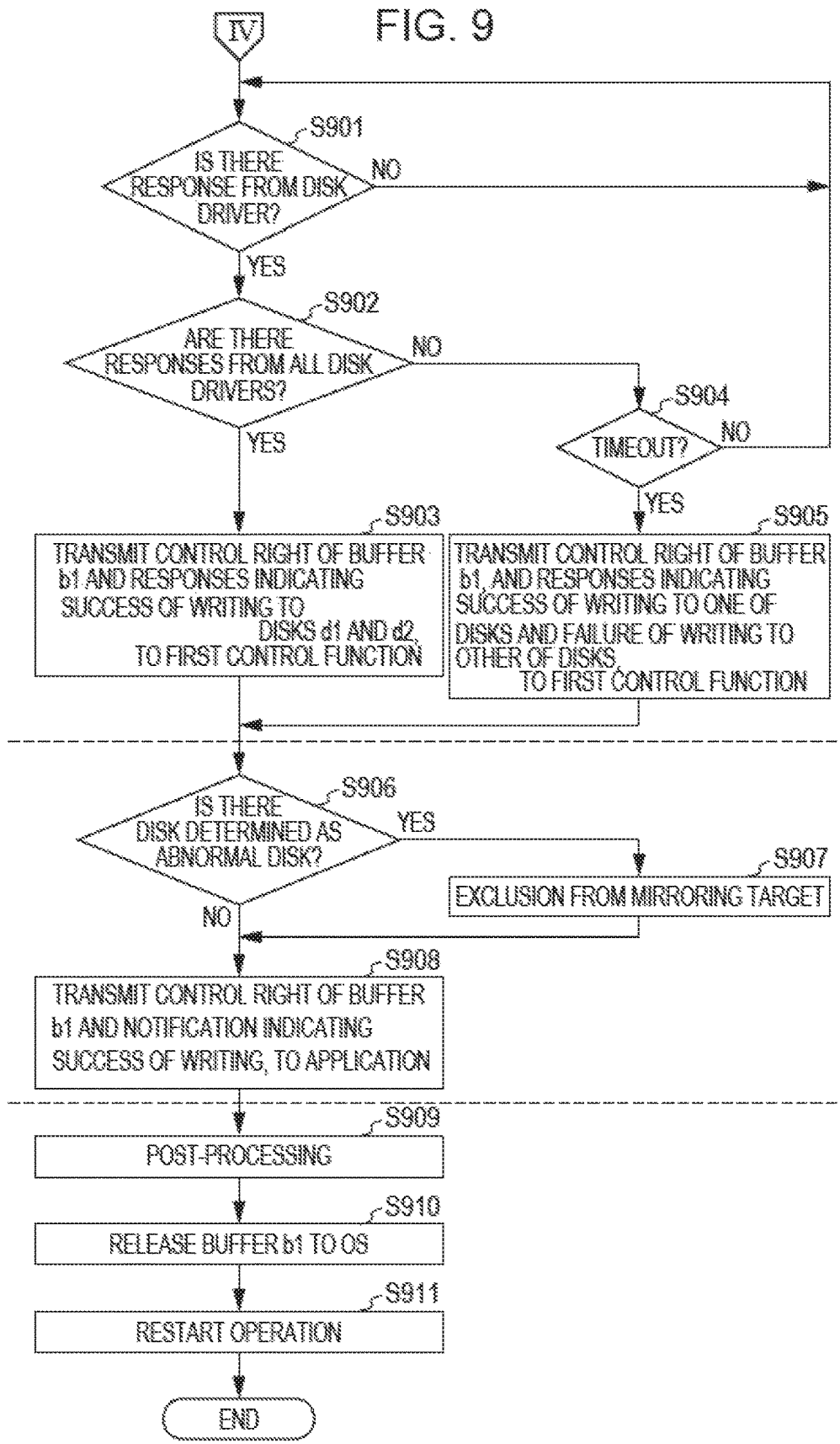

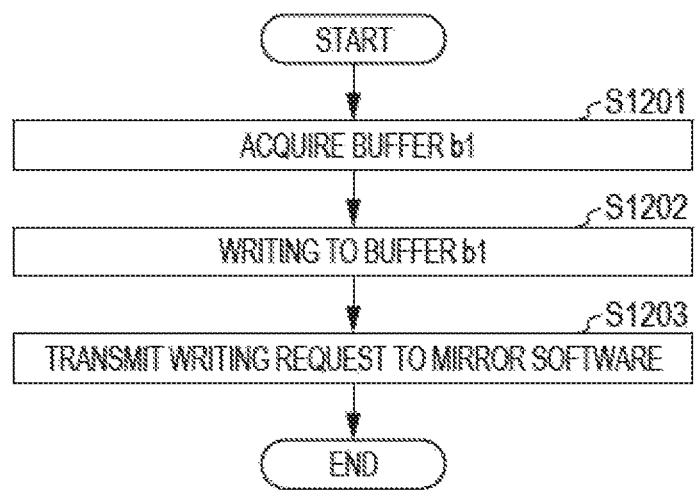
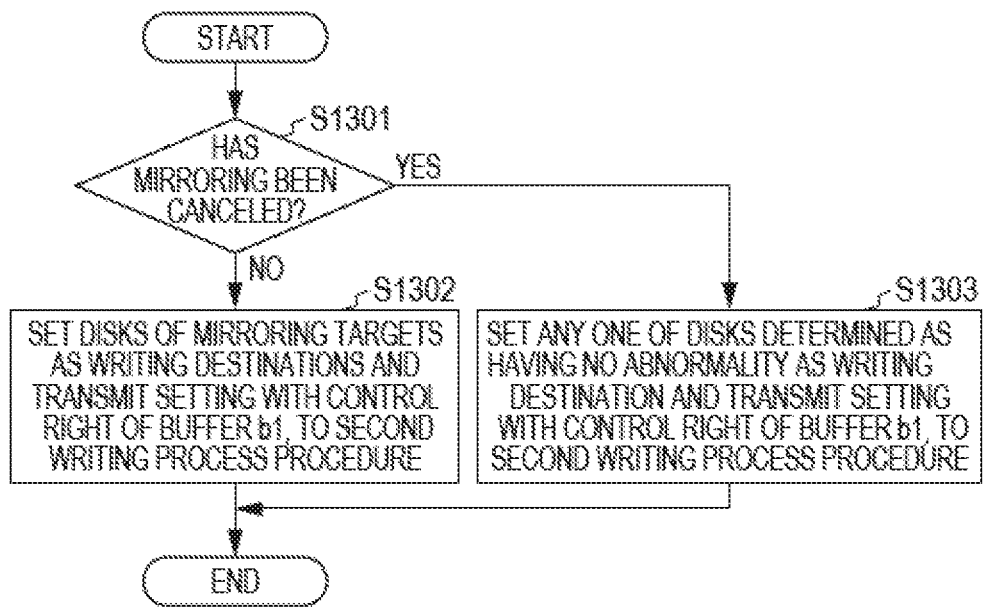

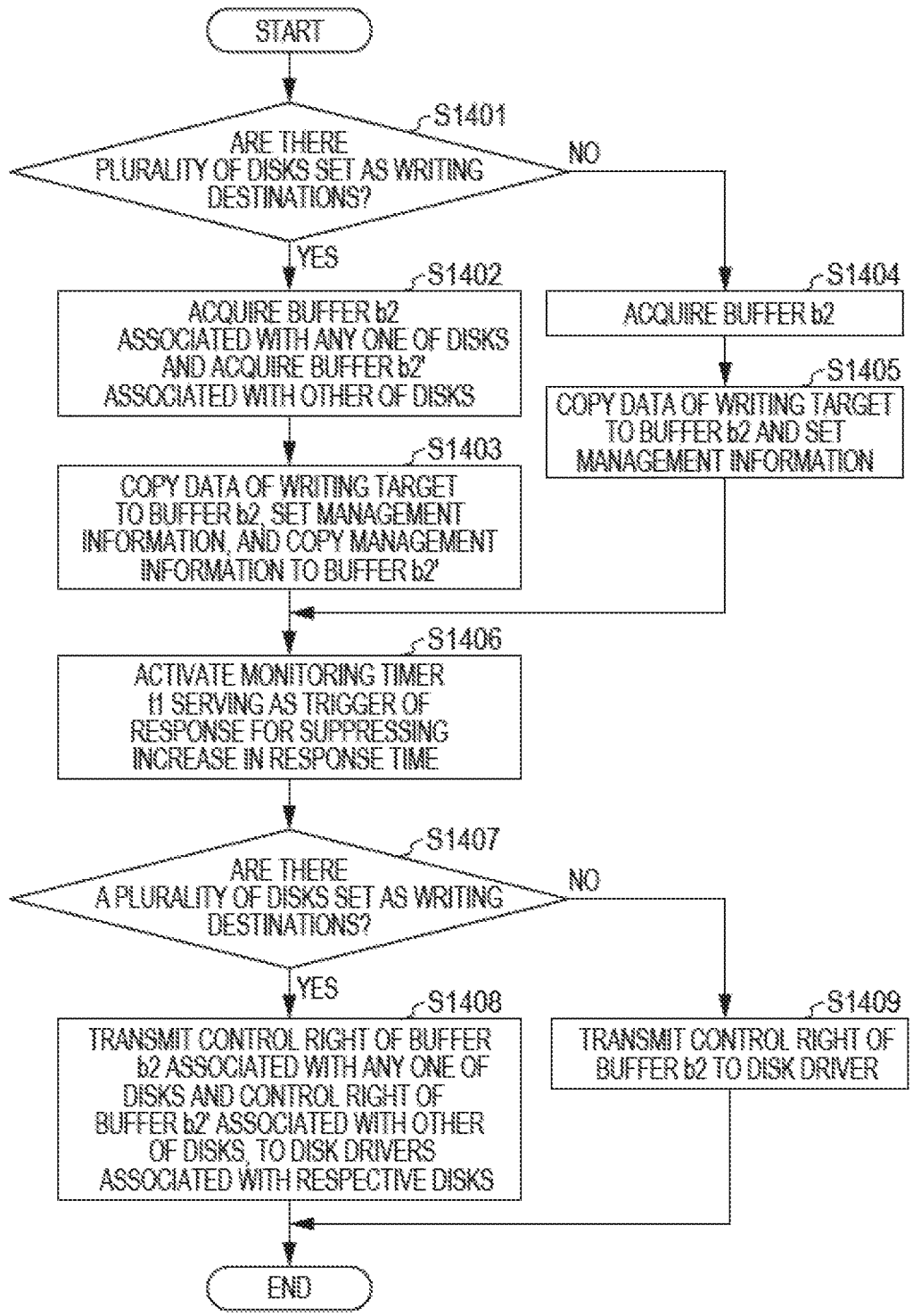

APPARATUS AND METHOD TO REDUCE A RESPONSE TIME FOR WRITING DATA TO REDUNDANT STORAGE DEVICES BY DETECTING COMPLETION OF DATA-WRITING TO AT LEAST ONE DRIVER BEFORE ELAPSE OF A RETRY-OVER TIME

CROSS-REFERENCE TO RELATED APPLICATION

This application is based upon and claims the benefit of priority of the prior Japanese Patent Application No. 2016-060947, filed on Mar. 24, 2016, the entire contents of which are incorporated herein by reference.

FIELD

The embodiment discussed herein is related to apparatus and method to reduce a response time for writing data to redundant storage devices.

BACKGROUND

In recent years, a mirroring technique of storing data after making the data redundant by using a plurality of storage devices has been used. For example, when receiving a request for writing data from application software, software which controls mirroring controls each of drivers respectively associated with a plurality of storage devices so as to write the data in each of the plurality of storage devices.

As the related art, a technique of monitoring an input/output response to an input/output request that is issued to an input/output device connected to a server through a certain route, and performing a timeout process when an input/output response is not issued within a timeout period, has been proposed. Furthermore, a technique of specifying a failure occurrence portion by determining whether failure has been caused by a disk device in an own apparatus or caused by a path, and instructing the number of times of retry and a path for retry, corresponding to a type of failure and the failure occurrence portion, has been proposed, for example. Furthermore, a technique of determining that a bus failure occurs in another system when communication timeout, a sequence error, or a notification indicating failure interruption is generated in at least two devices having successive addresses in the other system, has been proposed, for example. The related arts are disclosed in Japanese Laid-open Patent Publication Nos. 2009-223702, 2000-132413, and 2001-5683, for example.

SUMMARY

According to an aspect of the invention, upon receiving, from application software, a first request for writing data stored in a first storage region acquired by the application software, an apparatus acquires a second storage region which is different from the first storage region, and copies the data to the acquired second storage region. The apparatus transmits, to one of drivers associated with each of redundant storage devices on which mirroring is to be performed, a second request for writing the copied data to the each first storage device, where each of the drivers is configured to perform a data writing process of writing the data into one of the redundant storage devices associated with the each driver. The apparatus transmits, to the application software, a first response indicating that writing of the data has been successfully performed in a case where a second response indicating that the data writing process of writing the data into at least one of the redundant storage devices is completed is detected when a predetermined period of time has elapsed after the second request for writing the copied data is transmitted to the at least one of the drivers and before a retry-over time at which retry of the data writing process is performed by at least one of the drivers predetermined times, and exclude, from the redundant storage devices, a storage device for which the second response indicating that the data writing process is completed is not detected.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 8A and 8B are diagrams illustrating an example of an operational flowchart for various processes performed by a control device, according to an embodiment;

FIG. 9 is a diagram illustrating an example of an operational flowchart for various processes performed by a control device, according to an embodiment;

FIG. 12 is a diagram illustrating an example of an operational flowchart for a writing process performed by an application, according to an embodiment;

FIG. 13 is a diagram illustrating an example of an operational flowchart for a first writing process performed by mirror software, according to an embodiment;

FIG. 14 is a diagram illustrating an example of an operational flowchart for a second writing process performed by mirror software, according to an embodiment;

DESCRIPTION OF EMBODIMENTS

In the related arts described above, a period of time from when control software which controls mirroring receives a data writing request supplied from application software to when the control software responds to the request, may be increased. For example, control software which controls mirroring may not respond to the application software until the control software receives responses from all of the drivers which are respectively associated with a plurality of storage devices so that consistency of the data in the plurality of storage devices is ensured.

It is desirable to suppress increase of a response time to a data writing request.

Hereinafter, embodiments of a control program, a control method, and a control device according to the present disclosure will be described in detail with reference to the accompanying drawings.

[Embodiment of Control Method]

Figure 1:
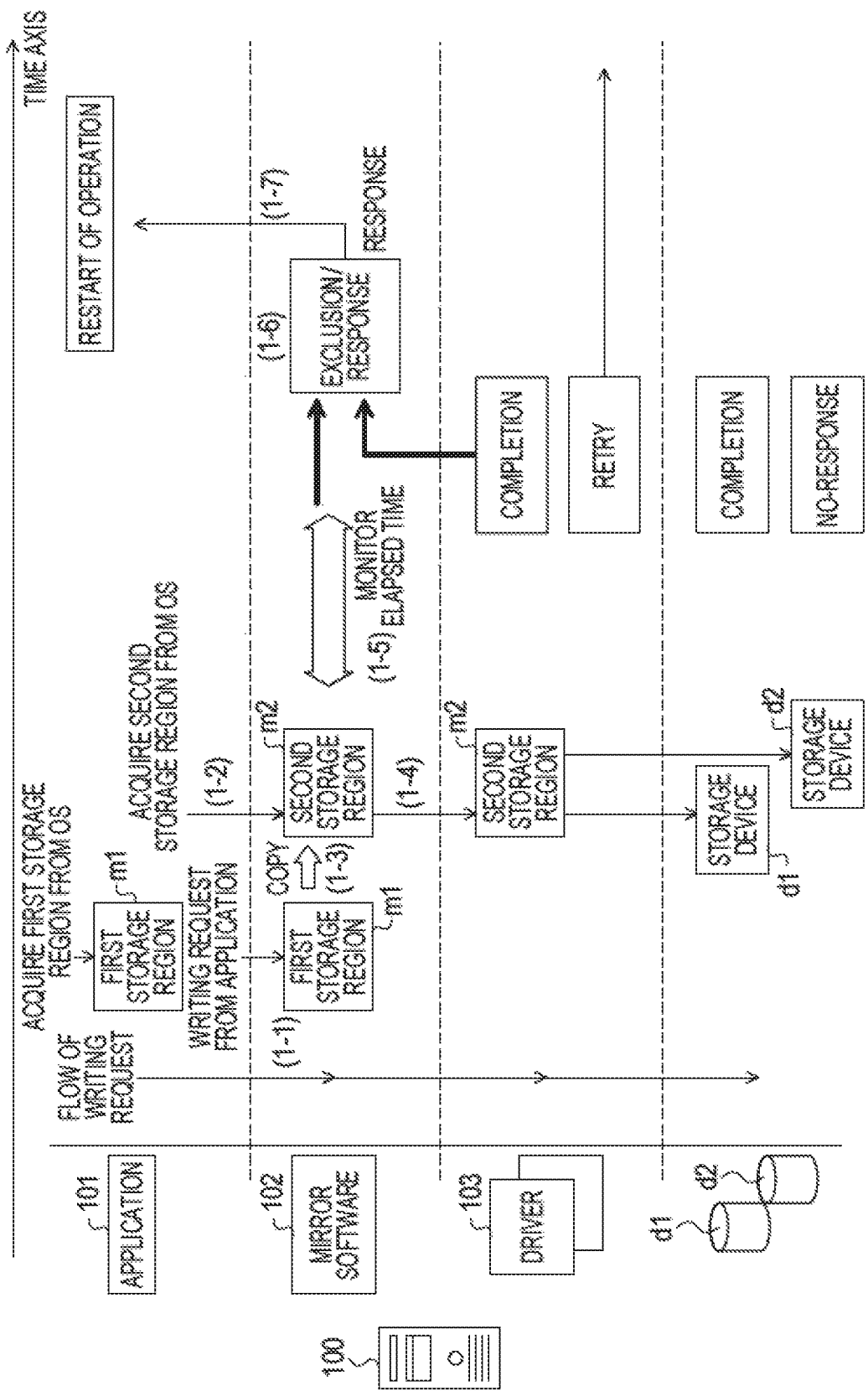
FIG. 1 is a diagram illustrating an example of a control method, according to an embodiment.

FIG. 1 is a diagram illustrating a control method according to an embodiment. In FIG. 1, a control device 100 is a computer which activates application software 101, software 102 which controls mirroring for storing redundant data by using a plurality of storage devices, and disk drivers 103 which are associated with the plurality of storage devices, respectively. Hereinafter, the application software 101 is also referred to as an "application 101." Furthermore, the software 102 which controls the mirroring is also referred to as "mirror software 102." Moreover, the disk drivers 103 are also referred to as "drivers 103" hereinafter.

Here, the application 101, the mirror software 102, and the drivers 103 may be individually operated as described below. For example, the application 101 acquires a buffer from an operating system (OS), stores data to be written in the buffer, and transmits a data writing request to the mirror software 102 along with a control right of the buffer. Thereafter, the application 101 does not perform any operation including reading of data which is requested to be written until the application 101 receives a response indicating that writing has been successfully performed from the mirror software 102.

Furthermore, when receiving the data writing request, the mirror software 102 transmits the data writing request along with the buffer control right to the drivers 103 respectively associated with the plurality of storage devices by using the buffer provided with the control right so as to write the data to the storage devices. The mirror software 102 transmits a response indicating whether the writing has been successfully performed to the application 101 after receiving responses indicating whether the writing has been successfully performed from the plurality of drivers 103, respectively, so as to maintain the data consistency. In other words, the mirror software 102 does not transmit a response indicating whether the writing has been successfully performed to the application 101 until the mirror software 102 receives responses indicating whether the writing has been successfully performed from the plurality of drivers 103, respectively.

When receiving a data writing request, a driver 103 registers a task corresponding to the data writing request to a queue, and attempts data writing to the storage device based on the buffer provided with the control right in accordance with the task obtained from the queue. When timeout of the data writing occurs, the driver 103 attempts data writing to the storage device again until a predetermined number of times the attempt is performed. When the data writing has been successfully performed, the driver 103 transmits a response indicating that the data writing has been successfully performed to the mirror software 102. On the other hand, when the timeout of the data writing occurs the predetermined number of times, the driver 103 does not attempt the data writing to the storage device again and transmit a response indicating that the data writing has failed to the mirror software 102.

However, in this case, a response time of the mirror software 102 for the data writing request supplied from the application 101 may be increased due to first and second reasons as described below. Accordingly, the operation of the application 101 slows down, and therefore, processing ability of the application 101 requested by a user may not be ensured.

The first reason is that a failure occurs at one of the plurality of storage devices, for example. Failures occurring at one of the storage devices may include a failure on a transmission path from the control device 100 to the one of the storage devices. According to the first reason, since the driver 103 transmits a response to the mirror software 102 after attempting the data writing to the storage device a predetermined number of times, a response time of the driver 103 for the writing request from the mirror software 102 are increased. Furthermore, the mirror software 102 responds to the application 101 only after the mirror software 102 receives a response from the driver 103, and therefore, a response time of the mirror software 102 for the writing request from the application 101 is also increased.

The second reason is that the application 101 consecutively transmits data writing requests to the mirror software 102 in addition to the first reason. According to the second reason, the driver 103 responds to the mirror software 102 after attempting a data writing to the storage device the predetermined number of times for each task stored in a queue. Therefore, a response time of the driver 103 for the writing request from the mirror software 102 is further increased.

Therefore, in this embodiment, description will be given of a control method for suppressing increase of a response time of the mirror software 102 for a data writing request supplied from the application 101 even in a case where a failure occurs in one of the plurality of storage devices. According to the control method, the increase of the response time of the mirror software 102 may be suppressed without changing operations of the application 101 and the drivers 103.

In FIG. 1, the control device 100 is coupled to a plurality of storage devices (disks) on which mirroring is to be performed. Examples of the disks include a magnetic disk, an optical disk, a disk array, a solid state drive (SSD), and an all flash disk array. In the control device 100, the application 101 is activated. Furthermore, in the control device 100, the mirror software 102 is activated. Moreover, in the control device 100, the drivers 103 respectively associated with the plurality of disks are activated. The drivers 103 are disk drivers 103, for example.

In the example of FIG. 1, the application 101 acquires a first storage region m1, and transmits a request for writing data stored in the first storage region m1, to the mirror software 102. The first storage region m1 includes a region to store data to be written. The data writing request is transmitted along with a control right of the first storage region m1, for example.

The application 101 acquires the first storage region m1 from the OS, and stores the data to be written in the first storage region m1, for example. Specifically, the data to be written is stored in a region, for storing data to be written, within the first storage region m1. Then the application 101 transmits a data writing request stored in the first storage region m1 to the mirror software 102 along with the control right of the first storage region m1. Here, in a case where the first storage region m1 becomes not available, the application 101 which has acquired the first storage region m1 is supposed to release the first storage region m1 by the book.

(1-1) The mirror software 102 receives a request for writing the data stored in the first storage region m1 from the application 101. The mirror software 102 receives the request for writing the data stored in the first storage region m1 from the application 101 along with the control right of the first storage region m1, for example.

(1-2) When receiving the writing request, the mirror software 102 obtains and secures a second storage region m2 which is different from the first storage region m1. The second storage region m2 includes a region to store data to be written. The mirror software 102 requests a second storage region m2 which is different from the first storage region m1 from the OS, and secures the second storage region m2 allocated by the OS, for example.

(1-3) The mirror software 102 copies the data stored in the first storage region m1 into the secured second storage region m2. In the description hereinafter, the data copied into the second storage region m2 is also referred to as "copied data."

(1-4) The mirror software 102 transmits a request for writing the copied data to disks d1 and d2 on which mirroring is to be performed, to the drivers 103 respectively associated with the disks d1 and d2. The mirror software 102 transmits a request for writing the copied data to a plurality of disks, to the drivers 103 respectively associated with the plurality of disks, along with a control right of a region to store the copied data, included in the second storage region m2, for example.

By this, the mirror software 102 may transmit data writing requests to the individual drivers 103 without using the first storage region m1. This allows the mirror software 102 to cause the drivers 103 to continue the operation thereof even if the control right of the first storage region m1 is returned to the application 101.

Each of the drivers 103 receives a request for writing the copied data stored in the second storage region m2 to one of the disks corresponding to the each driver 3 from the mirror software 102, and attempts writing of the copied data to the disk, for example. Each of the drivers 103 receives a request for writing the copied data to the disk corresponding to the each driver 103 from the mirror software 102 along with the control right of a region to store the copied data included in the second storage region m2m, and attempts writing of the copied data to the disk, for example. Then each of the drivers 103 transmits a response indicating whether the copied data has been successfully written to the mirror software 102.

(1-5) The mirror software 102 monitors an elapsed time after the request for writing the copied data is transmitted to the driver 103 so as to detect that a predetermined period of time has elapsed before retry-over of a data writing process performed by the driver 103 after the request for writing the copied data is transmitted to the driver 103. For example, the mirror software 102 activates a monitoring timer when transmitting the request for writing the copied data to the driver 103 so as to detect that the predetermined period of time has elapsed before the retry-over of the data writing process performed by the driver 103 after the request for writing the copied data is transmitted to the driver 103, for example.

The predetermined period of time is set at a value that is shorter than a period of time from when the driver 103 receives the data writing request to when retry-over of the data writing occurs. The predetermined period of time may be set at a value that is longer than a period of time from when the drivers 103 receive the data writing request to when first data writing is attempted.

By this, even if a response indicating whether the writing has been successfully performed has not been transmitted from the driver 103, the mirror software 102 may determine that a disk, which does not transmit a response indicting whether the writing has been successfully performed when the predetermined period of time has passed, is a disk having a potential for abnormality. Furthermore, the mirror software 102 may determine that even a disk, for which an associated one of the drivers 103 has transmitted a response indicating that the writing has been successfully performed, is also an unstable disk and intermittent failure may occur in the disk since data writing was retried a plurality of times by the associated one of the drivers 103.

(1-6) In a case where a response indicating that the writing has been successfully performed on at least one of the disks d1 and d2 is detected when the predetermined period of time has elapsed, the other one of the disks d1 and d2 which has not issued a response indicating that the writing has been successfully performed is separated and excluded from mirroring targets. In a case where a response indicating that the writing has been successfully performed on at least one of the plurality of disks is issued before the predetermined period of time elapses, the mirror software 102 excludes the other one of the disks which has not issued a writing response from mirroring targets. The disk which has not issued a writing response is a disk having a potential for abnormality as described above.

Accordingly, a disk having a potential for abnormality may be excluded from mirroring targets so that data consistency is maintained. Furthermore, the mirror software 102 may exclude a disk, which is not in a state in which data writing thereto always fails but has entered an unstable state and may be subjected to intermittent failures, from mirroring targets. Therefore, the mirror software 102 may avoid data loss caused by continuous use of the unstable disk and may ensure data consistency.

(1-7) In a case where a response indicating that the writing has been successfully performed on at least one of the disks d1 and d2 is detected when the predetermined period of time has elapsed, the mirror software 102 transmits a response indicating that the writing has been successfully performed to the application 101. In a case where a response indicating that writing has been successfully performed on at least one of the disks is detected when elapse of the predetermined period of time is detected, the mirror software 102 transmits a response indicating that the writing has been successfully performed to the application 101.

Accordingly, the mirror software 102 may respond to the application 101 even while the drivers 103 are attempting the writing to the disks d1 and d2, by causing the drivers 103 to attempt writing to the disks d1 and d2 without using the first storage region m1. Furthermore, upon detecting elapse of the predetermined period of time, the mirror software 102 may excludes, from mirroring targets, a disk which has not issued a response indicating that the writing has been successfully performed and may have malfunction.

This allows the mirror software 102 to respond to the application 101 without waiting for responses from the plurality of drivers 103, thereby suppressing increase in a response time and avoiding delay of a response. In other words, the mirror software 102 may suppress increase in a response time even if a disk has malfunction. Furthermore, the mirror software 102 may suppress increase in a response time even in a case where data writing requests are consecutively received. Furthermore, upon receiving a data reading request or the like from the application 101, the mirror software 102 may avoid reading of data or the like from a disk, among the disks d1 and d2, which may have malfunction.

Even while the drivers 103 are attempting data writing, the application 101 may release the first storage region m1 when receiving a response indicating that the writing has been successfully performed, and may restart the operation including data reading. The application 101 may easily ensure processing ability requested by the user of the application 101.

Furthermore, the mirror software 102 may release the second storage region m2 when the drivers 103 have respectively returned the responses. By this, even after the mirror software 102 has excluded one of the disks d1 and d2 from the mirroring targets or has responded to the application 101, the mirror software 102 is able to release the second storage region m2, without maintaining the second storage region m2, so that the second storage region m2 is returned to the OS.

Although the case where the control device 100 includes the drivers 103 which are independently provided for the disks d1 and d2 has been described in this embodiment, the present technique is not limited to this. For example, one driver 103 included in the control device 100 may be commonly used for control of data writing to the plurality of disks d1 and d2.

Although a detailed description is omitted here for simplicity of description, the first storage region m1 further includes a region for storing information on management of data to be written. Similarly, the second storage region m2 further includes a region for storing information on management of data to be written.

[Example of System Configuration of Control Device 100]

Next, an example of a system configuration of the control device 100 will be described with reference to FIG. 2.

Figure 2:
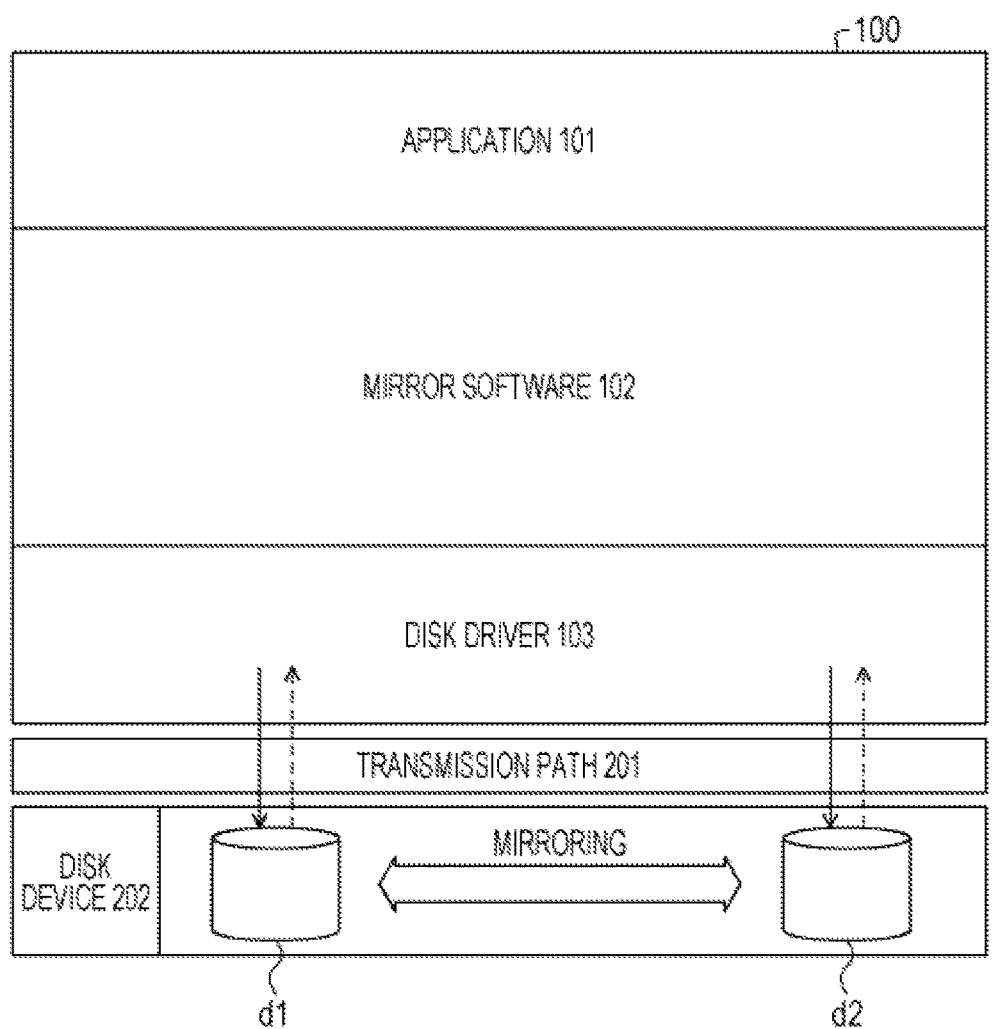
FIG. 2 is a diagram illustrating an example of a configuration of a control device, according to an embodiment.

FIG. 2 is a diagram illustrating a system configuration of the control device 100. In FIG. 2, the control device 100 and a disk device 202 are coupled to each other through a transmission path 201. For example, the transmission path 201 is a fiber channel (FC), a small computer system interface (SCSI), a serial attached SCSI (SAS), or the like.

The control device 100 includes an OS. The OS allocates hardware resources to software. The OS manages a free pool of buffers included in a memory 302 described below with reference to FIG. 3, and allocates a buffer of the free pool to software in response to a request from the software. The control device 100 includes software having a layered structure. The control device 100 includes, for example, the application 101, the mirror software 102, and the drivers 103 in the order of layer from highest to lowest. Operations of the application 101, the mirror software 102, and the drivers 103 will be described hereinafter with reference to FIGS. 6 and 7. The disk device 202 includes a plurality of disks which are mirroring targets. In the example of FIG. 2, the disk device 202 includes the disks d1 and d2.

[Example of Hardware Configuration of Control Device 100]

Next, an example of a hardware configuration of the control device 100 will be described with reference to FIG. 3.

Figure 3:
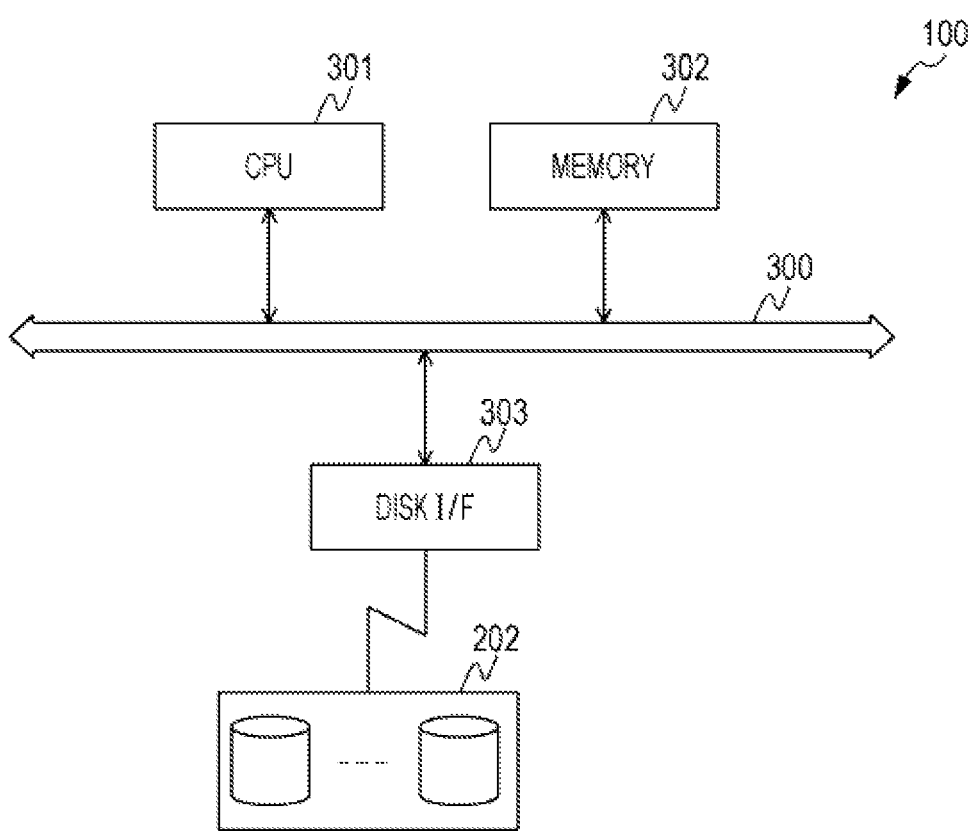
FIG. 3 is a diagram illustrating an example of a hardware configuration of a control device, according to an embodiment.

FIG. 3 is a diagram illustrating a hardware configuration of the control device 100. In FIG. 3, the control device 100 includes a central processing unit (CPU) 301, the memory 302, and a disk interface (I/F) 303. The configuration units are coupled to each other via a bus 300.

Here, the CPU 301 controls the entire control device 100. The memory 302 includes a read only memory (ROM), a random access memory (RAM), or a flash ROM. For example, the flash ROM or the ROM stores various programs and the RAM is used as a work area of the CPU 301. The programs stored in the memory 302 are loaded by the CPU 301 so as to cause the CPU 301 to execute coded processes.

The disk I/F 303 is coupled to the disk device 202, serves as an interface between the disk device 202 and the internal devices, and controls input/output of data between the disk device 202 and the internal devices. The disk I/F 303 corresponds to the transmission path 201 described above, for example.

The control device 100 may include an SSD, a semiconductor memory, a keyboard, a mouse, a display, or the like, in addition to the configuration units described above. The control device 100 is realized by a server, a personal computer (PC), or the like.

[Storage Content of Various Tables]

Next, an example of storage content of various tables including a mirror state management table 400, an issued I/O queue management table 410, and an issued I/O management table 420 will be described with reference to FIG. 4. The various tables are realized by storage regions, such as the memory 302 and the disk device 202 illustrated in FIG. 3, for example. Furthermore, the various tables are generated by the mirror software 102, for example. For example, the mirror state management table 400 and the issued I/O queue management table 410 are generated as a set for each disk group of a mirroring target.

Figure 4:
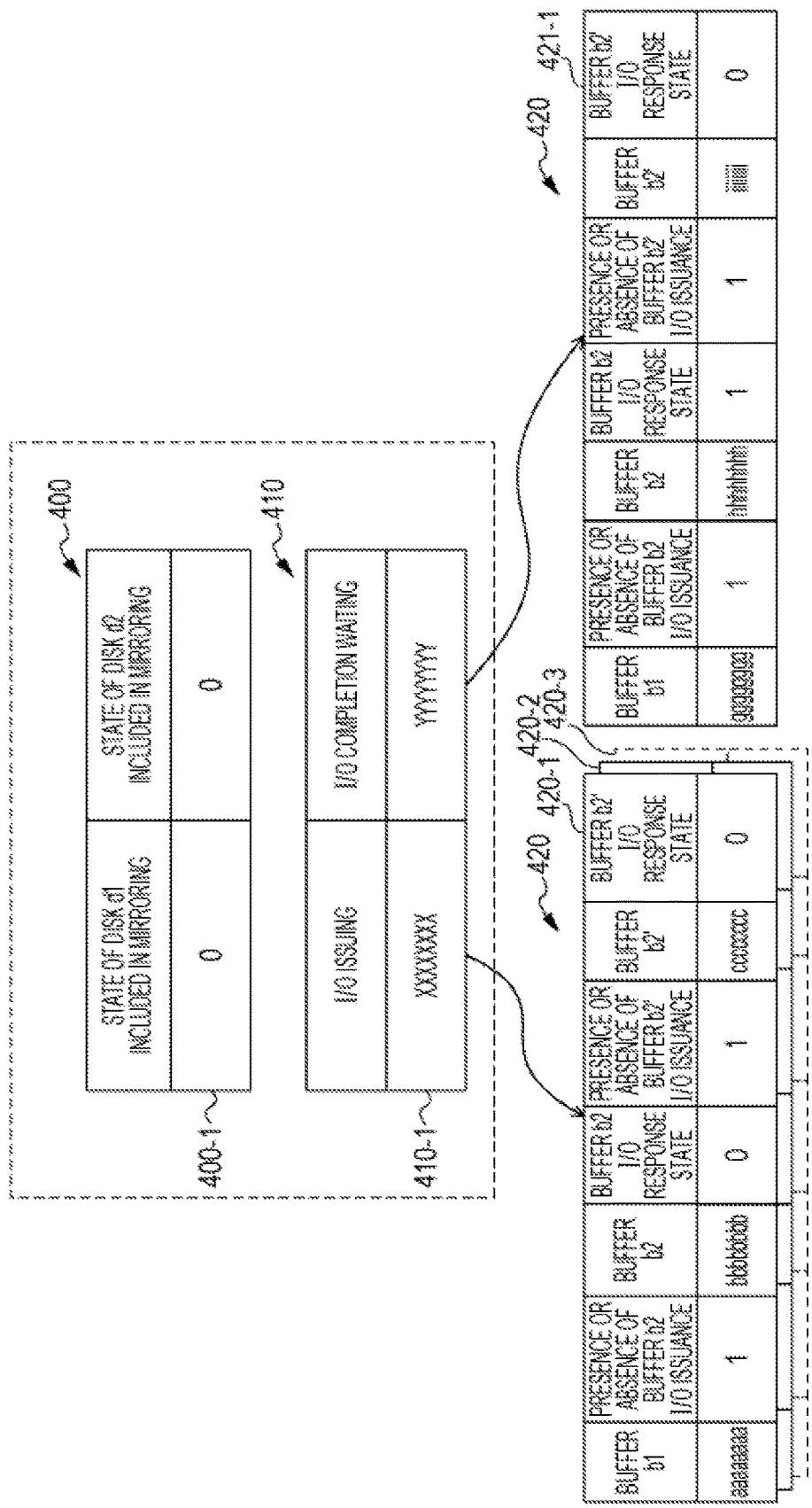
FIG. 4 is a diagram illustrating an example of storage content in tables, according to an embodiment.

FIG. 4 is a diagram illustrating content stored in the various tables. As illustrated in FIG. 4, the mirror state management table 400 includes fields for states of disks involved in the mirroring. The mirror state management table 400 stores mirroring state management information as a record 400-1, for example, every time mirroring is set.

The states of disks involved in the mirroring are represented by flags each indicating whether a disk which has been subjected to mirroring management is normal or abnormal. A state of a disk involved in the mirroring is "0" when the disk subjected to the mirroring management is normal. A state of a disk involved in the mirroring is "1" when the disk subjected to the mirroring management is abnormal. When a failure is detected in writing to one of the disks with reference to responses (notifications) from a second control function, the mirror state management table 400 changes a state of the disk involved in the mirroring, within the mirror state management table 400, to "1" so that the abnormal disk is excluded (closed).

When a state of the disk involved in the mirroring is represented by "0, 0", for example, it is determined that the mirroring has been successfully performed. Furthermore, when the states of the disks involved in the mirroring are represented by "0, 1", for example, it is determined that one of the disks serving as a mirroring source is normal but the other one of the disks serving as a mirroring destination is abnormal. Furthermore, when the states of the disks involved in the mirroring are "1, 0", it is determined that the disk of the mirroring source is abnormal but the disk of the mirroring destination is normal.

Furthermore, as illustrated in FIG. 4, the issued I/O queue management table 410 includes a field "I/O issuing" and a field "I/O completion waiting". Issued I/O queue management information is stored in the issued I/O queue management table 410 as a record 410-1 every time mirroring is set.

The issued I/O queue management table 410 manages a group of writing requests (issued I/O) that are transmitted from the mirror software 102 to a plurality of disk drivers 103, respectively, in response to a writing request issued from the application 101. The term "I/O issuing" represents an address indicating the issued I/O management table 420 which manages the writing request (issued I/O) group. The term "I/O issuing" represents an address, for example, indicating an issued I/O management table 420 in a state in which a writing request has been issued to plural disk drivers 103, responses of the respective plural disk drivers 103 are being waited, and a predetermined period of time has not elapsed, for example. Furthermore, the term "I/O issuing" may include an address of an issued I/O management table 420 in a state in which a response of normal writing is supplied from one of the plural disk drivers 103 and a response from the other of the plural disk drivers 103 is waited within the predetermined period of time.

A term "I/O completion waiting" represents an address indicating an issued I/O management table 420 which manages the writing request (issued I/O) group. In this case, the term "I/O completion waiting" represents an address, for example, indicating an issued I/O management table 420 in a state in which a response of normal writing has been issued from one of the plural disk drivers 103 and a response from the other of the plural drivers 103 is being waited after the predetermined period of time. Here, a disk in which the response thereof is being waited enters an abnormal state as a state of the disk involved in the mirroring in the mirror state management table 400.

As illustrated in FIG. 4, the issued I/O management table 420 is stored at an address destination of the issued I/O queue management table 410, and stored as records 420-1, 420-2, and 420-3 corresponding to the writing requests (issued I/O) to the respective drivers 103. Then the records 420-1, 420-2, and 420-3 corresponding to the writing requests (issued I/O) may be obtained with reference to the address set in the issued I/O queue management table 410. Each of the records 420-1, 420-2, and 420-3 includes fields used for writing and a response for each writing request (issued I/O). The issued I/O management table 420 includes fields of addresses of individual buffers, fields indicating presence and absence of I/O issuance for buffers b2 and b2', and fields of I/O response states for each writing request (issued I/O). Furthermore, when a state of the writing request (issued I/O) changes from "I/O issuing" to "I/O completion waiting", the issued I/O management table 420 corresponding to "I/O issuing" included in the issued I/O queue management table 410 is changed to the issued I/O management table 420 corresponding to "I/O completion waiting". (For example, information in fields of the record 420-3 in the issued I/O management table 420 denoted by a dotted line is updated and the record 420-3 is changed to a record 421-1.)

The field "presence or absence of I/O issuance of buffer b2" is represented by a flag indicating presence or absence of a writing request to the disk drivers 103. The field "presence or absence of I/O issuance of buffer b2" is "0" when a writing request has not been issued and otherwise "1", for example. The field "presence or absence of I/O issuance of buffer b2'" is the same as the field "presence or absence of I/O issuance of buffer b2".

The field "buffer b1" indicates a buffer 1 acquired from the OS so as to be used when the application 101 writes data to the disk device 202, and represents an address of the buffer 1 having a management region ma1 and a data region da1. The buffer b1 corresponds to the first storage region m1 illustrated in FIG. 1, for example.

The field "buffer b2" indicates a buffer 2 acquired by the second control function so that a response to the application 101 and waiting for a response from the drivers 103 may be separately processed after a writing request is received by the mirror software 102, and represents an address of the buffer b2 which has a management region ma2 and a data region da2 and which is different from the buffer b1. The buffer b2 corresponds to the second storage region m2 illustrated in FIG. 1, for example, and is associated with one of the disks which is a writing target of mirroring.

Although the buffer b2' is the same as the buffer b2, the buffer b2' may not include a data region since the buffer b2' may use the data region da2 of the buffer b2. The buffer b2' corresponds to the second storage region m2 illustrated in FIG. 1, for example, and corresponds to the other one of the disks which is a writing target of mirroring. Note that the mirror software 102 copies data to be written, which is received from the application 101 and which is stored in the buffer b1, to the data region da2 of the buffer b2, and sets management information in the management region ma2 of the buffer b2. Furthermore, the mirror software 102 copies the management information stored in the buffer b2 to the management region ma2' of the buffer b2'.

The field "I/O response state of buffer b2" is a flag indicating whether responses have been transmitted form the disk driver 103. The field "I/O response state of buffer b2" is "0" when the state is "I/O response waiting" and "1" when the state is "I/O response". The field "I/O response state of buffer b2'" is the same as the field "I/O response state of buffer b2".

[Example of Functional Configuration of Control Device 100]

Next, an example of a functional configuration of the control device 100 will be described with reference to FIG. 5.

Figure 5:
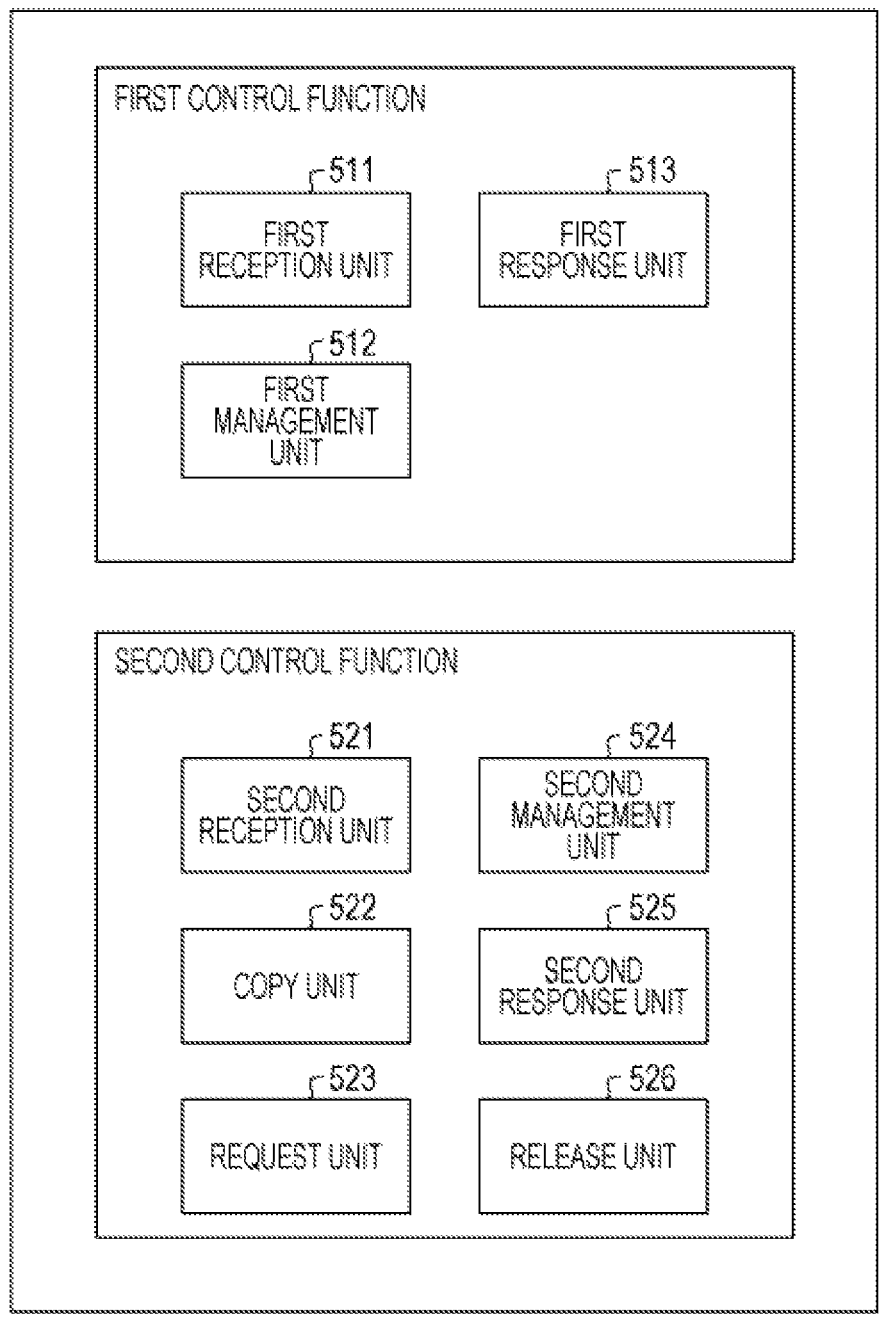
FIG. 5 is a diagram illustrating an example of a functional configuration of a control device, according to an embodiment.

FIG. 5 is a block diagram illustrating a functional configuration of the control device 100. The control device 100 includes first and second control functions. The control device 100 includes a first reception unit 511, a first management unit 512, and a first response unit 513 which are included in the first control function. The control device 100 further includes a second reception unit 521, a copy unit 522, a request unit 523, a second management unit 524, a second response unit 525, and a release unit 526 which are included in the second control function.

For example, in the first control function, the first reception unit 511 may include a reception unit which receives a writing request from the application 101, the first management unit 512 may include a mirror management unit which determines a disk whose mirroring state is checked in accordance with the mirror state management table 400 and to which a writing request is issued, a mirror management unit which transmits a writing request and a control right of a buffer to the second reception unit 521, and a mirror management unit which, upon receiving responses from the second response unit 525, performs response to the application 101 and excludes (closes) the mirroring on an abnormal side in accordance with individual states of the responses, the first response unit 513 may include a response unit which performs response to the application 101 in accordance with a response from the second response unit 525 and an instruction issued by the first management unit 512, and a mirror separation unit which receives the response from the second response unit 525 and excludes an abnormal disk while performing response to the application 101. Furthermore, in the second control function, the second reception unit 521 may include a reception unit which receives a writing request from the first management unit 512, the copy unit 522 may include a copy unit which obtains a copied buffer and copies data requested to be written, the request unit 523 may include a writing request unit which activates a monitoring timer and transmits a request for writing copied data to the drivers 103, the second management unit 524 may include a management unit which monitors responses from the drivers 103 and returns a response to a writing request to the first response unit 513, and the second response unit 525 which returns a response to a writing request to the first response unit 513, and the buffer release unit 526 which releases a buffer in response to an instruction issued by the second management unit 524.

The first reception unit 511 to the release unit 526 function as a control unit, and the functions thereof are realized when the CPU 301 executes programs stored in the storage devices, such as the memory 302 and the disk device 202 illustrated in FIG. 3 or realized by the disk I/F 303, for example. Various processing results of the functional units are stored in the storage devices, such as the memory 302 and the disk device 202 illustrated in FIG. 3, for example.

The first reception unit 511 receives a data writing request stored in the first storage region m1 acquired by the application 101, from the application 101. The first storage region m1 is a storage region that is requested from the application 101 to the OS and allocated by the OS to the application 101. The first storage region m1 includes a storage region which stores data to be written and a storage region which stores management information, for example. The first storage region m1 corresponds to the buffer b1, for example. The first reception unit 511 receives a request for writing data stored in the buffer b1 along with the control right of the buffer b1, from the application 101, for example.

The first management unit 512 checks a mirroring state in accordance with the mirror state management table 400, determines a disk to which a writing request is to be issued, and transmits the writing request to the second reception unit 521. When both of the disks of the mirroring targets are normal and mirroring is not canceled, the first management unit 512 transmits the control right of the buffer b1 to the second reception unit 521, and transmits a writing request so that writing is performed to both of the disks, to the second reception unit 521. On the other hand, when one of the disks is abnormal and mirroring thereof is canceled, the first management unit 512 transmits the control right of the buffer b1 and a writing request, to the second reception unit 521, so that writing is performed to the other one of the disks which is normal, for example. The function of the first management unit 512 described above may be included in the first reception unit 511.

The second reception unit 521 receives a request for writing data stored in the buffer b1 from the first management unit 512 along with the control right of the buffer b1 received by the first reception unit 511 from the application 101.

Upon receiving the writing request, the second reception unit 521 updates the issued I/O management table 420. The second reception unit 521 sets "1" to the field "presence or absence of I/O issuance of buffer b2" and "0" to the field "presence or absence of I/O issuance of buffer b2'" in a case where both of the disks are normal, the mirroring is not canceled, and the writing request for writing to both of the disks is received, for example. The second reception unit 521 sets "1" to the field "presence or absence of I/O issuance of buffer b2" and "0" to a field "presence or absence of I/O issuance of the buffer b2'" in a case where one of the disks is abnormal, the mirroring is canceled, and the writing request for writing to the other of the disks which is normal is received.

When the second reception unit 521 receives the writing request, the copy unit 522 obtains and secures a second storage region m2 which is different from the first storage region m1. The second storage region m2 is allocated by the OS. The first storage region m2 includes a storage region which stores data to be written and storage regions which store management information to be used by the respective disk drivers 103, for example. The second storage region m2 corresponds to a combination of the buffer b2 and the buffer b2', for example. Then the copy unit 522 copies the data in the acquired second storage region m2.

The copy unit 522 requests the buffer b2 to be used by one of the drivers 103 and the buffer b2' to be used by the other of the drivers 103, from the OS, for example. In a case where the number of the others of the disk drivers 103 is plural, a plurality of buffers b2' may be provided so as to correspond to the number of the others of the disk drivers 103. The copy unit 522 acquires the buffer 2 to be used by one of the drivers 103 and the buffer b2' to be used by the other of the drivers 103 which are allocated by the OS. Then the copy unit 522 copies data to be written stored in the buffer b1 to the acquired buffer b2 and sets management information thereto. Furthermore, the copy unit 522 copies the management information stored in the buffer b2 to the buffers b2' to be used by the others of the acquired disk drivers 103.

For example, the copy unit 522 requests the buffer b2 to be used by one of the disk drivers 103 associated with one of the disks and requests the buffer b2' to be used by one of the disk drivers 103 associated with the other of the disks, from the OS, when "1" is set to the field "presence or absence of I/O issuance of buffer b2" included in the issued I/O management table 420 and "1" is set to the field "presence or absence of I/O issuance of buffer b2'". Then the copy unit 522 copies the data to be written stored in the buffer b1 to the secured buffer b2, sets management information, and copies the management information stored in the buffer b2, to the acquired buffer b2'.

For example, the copy unit 522 requests the buffer b2 to be used by one of the drivers 103 associated with one of the disks which is normal, from the OS, when "1" is set to the field "presence or absence of I/O issuance of buffer b2" in the issued I/O management table 420 and "0" is set to the field "presence or absence of I/O issuance of buffer b2'" and does not request the buffer b2' to be used by one of the disk drivers 103 associated with the other of the disks which is abnormal, from the OS. Then the copy unit 522 copies the data to be written stored in the buffer b1 to the secured buffer b2 and sets management information thereto.

The request unit 523 transmits a request for writing the copied data to each of the plurality of disks, to the drivers 103 respectively associated with the plurality of disks. The plurality of disks are the disks d1 and d2 illustrated in FIG. 1, for example, which are mirroring targets and which are used to store redundant data. The driver 103 is software which controls writing of data to the disk. The driver 103 is a disk driver 103, for example.

The request unit 523 transmits a request for writing data to be written copied to the buffer b2 along with a control right of the buffer b2, to one of the drivers 103. The request unit 523 further transmits a request for writing data to be written, which has been copied to the buffer b2, along with a control right of the buffer b2' which is acquired for the other of the disk drivers 103, to the other of the disk drivers 103, respectively.

For example, the request unit 523 transmits a request for writing data to be written, which has been copied to the buffer b2, along with the control right of the acquired buffer b2, to one of the disk drivers 103 associated with one of the disks when "1" is set to the field "presence and absence of I/O issuance of buffer b2" included in the issued I/O management table 420 and "0" is set to the field "presence and absence of I/O issuance of buffer b2'". Furthermore, the request unit 523 transmits a request for writing data to be written, which has been copied to the buffer b2, along with the control right of the secured buffer b2', to one of the disk drivers 103 associated with the other of the disks.

Furthermore, the request unit 523 transmits a request for writing data to be written, which has been copied to the buffer b2, along with the control right of the secured buffer b2, to one of the drivers 103 associated with one of the disks which is normal when "1" is set to the field "presence and absence of I/O issuance of buffer b2" included in the issued I/O management table 420 and "0" is set to the field "presence and absence of I/O issuance of buffer b2'".

When transmitting the writing request to the drivers 103, the request unit 523 starts measurement of time elapsed after the writing request is transmitted. The request unit 523 activates the monitoring timer t1, for example.

When an instruction for writing to both of the disks is issued, the second management unit 524 waits for responses from both of the disk drivers 103 and monitors timeout of the monitoring timer t1. When responses indicating that the writing has been successfully performed are transmitted from both of the disk drivers 103 before the timeout of the monitoring timer t1, the second management unit 524 determines that normal writing has been performed, transmits a response indicating the normal writing to the first response unit 513, and returns the control right of the buffer b1.

Meanwhile, when an instruction for writing to both of the disks is issued, the second management unit 524 waits for responses from both of the drivers 103 and monitors timeout of the monitoring timer t1, for example. When only one of the disk drivers 103 transmits a response indicating that the writing has been successfully performed before the timeout of the monitoring timer t1, the second management unit 524 determines that the other of the disk drivers 103 has performed abnormal writing, transmits a response indicating that one of the disk drivers 103 has performed the normal writing and the other of the disk drivers 103 has performed the abnormal writing to the first response unit 513, and returns the control right of the buffer b1.

When an instruction for writing to only one of the disks is issued, for example, the second management unit 524 waits for a response from one of the drivers 103 and monitors timeout of the monitoring timer t1. When a response indicating that the writing has been successfully performed is transmitted from one of the disk drivers 103 before the timeout of the monitoring timer t1, the second management unit 524 determines that normal writing has been performed, transmits a response indicating the normal writing to the first response unit 513, and returns the control right of the buffer b1.

Hereinafter, a case where, although an instruction for writing is issued to both of the disks, only one of the disk drivers 103 transmits a response indicating that the writing has been successfully performed, and writing to the other of the disk drivers 103 is abnormal, will be described in detail. Here, the second management unit 524 may include a monitoring unit which monitors an elapsed time after the writing request is transmitted to the drivers 103 and which determines that a predetermined period of time has elapsed after the writing request is transmitted to the disk drivers 103, and a disk driver response waiting unit which waits for responses indicating that writing has been successfully performed from the disk drivers 103. Note that the second management unit 524 may include the function of the second response unit 525. The second management unit 524 may further include the function of the release unit 526 which releases a buffer in response to an instruction issued by the second management unit 524.

The second management unit 524 continues to wait for responses from the respective disk drivers 103. Upon receiving a response from one of the drivers 103, the second management unit 524 updates one of the field "I/O response state of buffer b2" and the field "I/O response state of buffer b2'" included in the I/O management table 420 which corresponds to one of the drivers 103 which has supplied the response, from "0" to "1".

In a case where a response indicating that writing has been successfully performed on at least one of the disks has been issued when the predetermined period of time has elapsed after a request for writing copied data is transmitted to the disk drivers 103, the second management unit 524 records the other of the disks for which a response indicating that writing has been successfully performed has not been issued. Here, the predetermined period of time is shorter than a period of time from when the drivers 103 receive the data writing request to when retry-over of the data writing to the disk is detected.

The second management unit 524 monitors an elapsed time after the writing request is transmitted to the drivers 103, and determines that a predetermined period of time has elapsed after the writing request is transmitted to the disk drivers 103. For example, after the writing request is transmitted to the drivers 103, recording is performed on the issued I/O queue management table 410 in accordance with the monitoring for the predetermined period of time and states of the responses from the plurality of disk drivers 103. Here, the second management unit 524 determines whether the disks have transmitted responses in accordance with information on the response states, with reference to the issued I/O management table 420, and specifies a disk for which a response has not been issued, in accordance with the determination. Furthermore, the second management unit 524 transmits a response indicating abnormality to the first response unit 513. By this response indicating the abnormality, the first management unit 512 updates the mirror state management table 400 associated with the disk for which a response indicating the abnormality has been issued, and excludes, from the mirroring targets, the disk for which the response indicating the abnormality has been issued.

In a case where responses indicating that writing has been successfully performed on the respective disks are issued before a predetermined period of time elapses after the request unit 523 transmits a request for writing copied data to the drivers 103, the second response unit 525 transmits a response indicating that the writing has been successfully performed to the first response unit 513. The second response unit 525 transmits a response indicating that the writing has been successfully performed to the first response unit 513 when responses indicating that the writing has been successfully performed on the respective plural disks are detected even before the elapsed predetermined period of time is detected. Furthermore, the second response unit 525 returns the control right of the buffer b1 to the first response unit 513.

In a case where a response indicating that the writing has been successfully performed to at least one of the disks has been transmitted when the predetermined period of time has elapsed after the request unit 523 transmits the request for writing the copied data to the drivers 103, the second response unit 525 determines that writing to the other of the disks is abnormal and transmits a response indicating that the writing to one of the disks is normal and writing to the other of the disks is abnormal, to the first response unit 513. In a case where a response indicating that the writing has been successfully performed to at least one of the disks has been transmitted when it is detected that the predetermined period of time has elapsed, for example, the second response unit 525 determines that the writing to the other of the disks is abnormal and transmits a response indicating that the writing to one of the disks is normal and the writing to the other of the disks is abnormal to the first response unit 513. Furthermore, the second response unit 525 returns the control right of the buffer b1 to the first response unit 513.

Upon receiving a response from the second response unit 525, the first management unit 512 transmits an instruction for returning a response to the application 101 to the first response unit 513, and updates the mirror state management table 400. In a case where the response from the second response unit 525 indicates that the writing has been successfully performed on the respective plural disks, the first management unit 512 instructs the first response unit 513 to return a response indicating that the writing has been successfully performed to the application 101. Furthermore, with respect to the writing to the respective disks, the first management unit 512 instructs the first response unit 513 to return, based on a response from the second response unit 525, a response indicating that the writing has been successfully performed to the application 101, for a disk for which the response indicating that the writing has been successfully performed has been issued, updates information of the mirror state management table 400 for a disk for which the response indicating abnormality has been issued, and excludes, from mirroring targets, the disk for which the response indicating abnormality has been issued.

The first management unit 512 may exclude a disk from mirroring targets at the same time as the first response unit 513 transmits a response indicating that the writing has been successfully performed on the disk to the application 101. Furthermore, the first management unit 512 may exclude a disk from mirroring targets in a period of time from when the first response unit 513 transmits a response indicating that the writing has been successfully performed on the disk to the application 101 to when the application 101 transmits a new writing request. The first management unit 512 may exclude a disk from mirroring targets when directly transmitting a response indicating that the writing has been successfully performed on the disk to the application 101.

In a case where both of the response from the second response unit 525 and the instruction from the first management unit 512 are received, the first response unit 513 returns the control right of the buffer b1 to the application 101 along with a response to the application 101.

The first response unit 513 may transmit a response indicating that the writing has been successfully performed to the application 101 at the same time as the first management unit 512 excludes the disk from mirroring targets. Furthermore, the first response unit 513 may transmit a response indicating that the writing has been successfully performed to the application 101 after the first management unit 512 excludes the disk from mirroring targets. Furthermore, the first response unit 513 may be configured to include a mirror separation unit which receives a response from the second response unit 525 and transmits a response to the application 101 upon excluding an abnormal disk.

The release unit 526 refers to the issued I/O management table 420 and, in a case where it is determined that all the drivers 103 respectively associated with the plurality of disks have transmitted responses, releases the second storage region m2. Here, each of the responses may be a response indicating that writing has been successfully performed on a corresponding one of the disks or a response indicating that writing has failed. In a case where a response indicating whether writing has been successfully performed or not has been issued for all the plurality of disk drivers 103, the release unit 526 releases the buffers b2 and b2', for example.

[Control Flow of Control Device 100]

Next, a flow of control performed by the control device 100 will be described with reference to FIG. 6.

Figure 6:
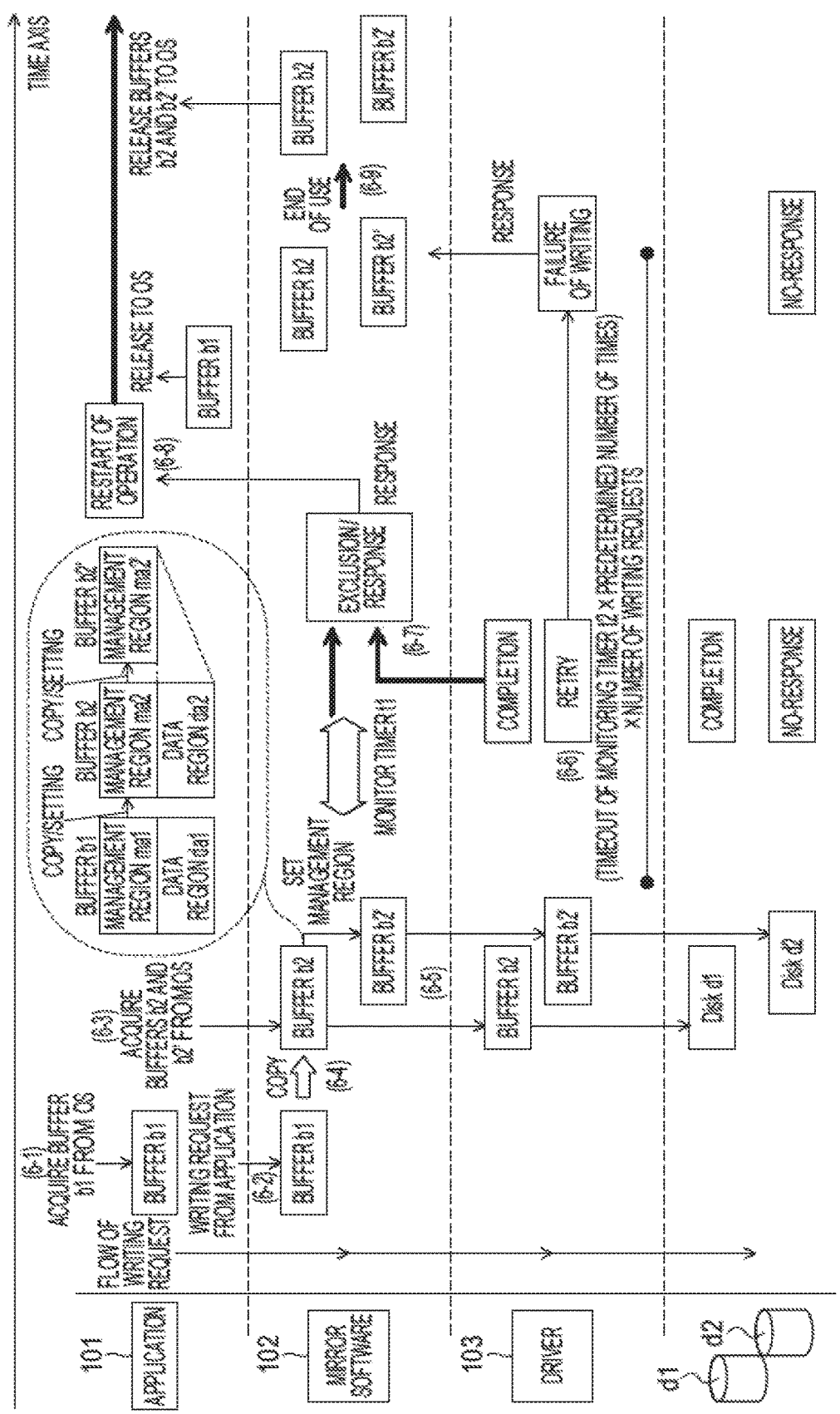
FIG. 6 is a diagram illustrating an example of a flow of control performed by a control device, according to an embodiment.

FIG. 6 is a diagram illustrating a flow of control performed by the control device 100. A case where the disk device 202 includes the two disks, that is, the disks d1 and d2, will be described in FIG. 6 as an example.

(6-1) The application 101 acquires the buffer b1 from the OS so as to write data to the disk device 202. The buffer b1 includes the management region ma1 and the data region da1. The management region ma1 stores management information. The data region da1 stores data to be written.

(6-2) The application 101 stores the management information and the data to be written in the management region ma1 and the data region da1 of the buffer b1 acquired in (6-1), respectively, and transmits a writing request and the control right of the buffer b1 to the mirror software 102.

(6-3) Upon receiving the writing request, the mirror software 102 acquires the buffers b2 and b2' from the OS, which are different from the buffer b1, so as to separately cope with a response to the application 101 and an operation of waiting for responses from the disk drivers 103. The buffer b2 includes the management region ma2 and the data region da2. The management region ma2 stores management information. The data region da2 stores data to be written.

The buffer b2' includes the management region ma2'. The management region ma2' is a storage region for storing management information. The buffer b2' may not include a data region since the buffer b2' may use the data region da2 of the buffer b2. The buffer b2' further includes a data region when the buffer b2' does not use the data region da2 of the buffer b2.

(6-4) The mirror software 102 copies the data to be written, which is stored in the buffer b1 received from the application 101, to the data region da1 of the buffer b2, and sets management information in the management region ma2 of the buffer b2. Furthermore, the mirror software 102 copies the management information stored in the buffer b2 to the management region ma2' of the buffer b2'.

(6-5) The mirror software 102 controls the disk drivers 103 so that writing to the disks d1 and d2 is performed using the buffers b2 and b2' including the data to be written copied in (6-4). Here, the mirror software 102 activates the monitoring timer t1.

(6-6) The disk driver 103 attempts, by using a monitoring timer t2, writing of data to a disk until timeout of the monitoring timer t2 is reached. When the monitoring timer t2 is timed out, the disk driver 103 attempts data writing to the disk again until a predetermined number of times the attempt of the data writing is performed.

(6-7) Since a response with respect to the disk d2 is not received even when the monitoring timer t1 is timed out, the mirror software 102 determines that the disk d2 may have failure. Then the mirror software 102 excludes the disk d2 from mirroring targets when a response indicating that the writing has been successfully performed on the disk d1 is received even if a response with respect to the disk d2 is not received.

Furthermore, upon excluding the disk d2 from mirroring targets, the mirror software 102 returns the control right of the buffer b1 along with the response indicating that the writing has been successfully performed, to the application 101. Here, one of the disk drivers 103 associated with the disk d2 is attempting data writing again.

(6-8) Upon receiving the response indicating that the writing has been successfully performed, the application 101 releases the buffer b1 acquired from the OS and returns the buffer b1 to the free pool of the OS.

(6-9) The mirror software 102 does not release the buffers b2 and b2' in which the data to be written and the management information were stored at (6-4), and waits for a response from the disk d2 determined as an abnormal disk. When a response is received from one of the disk drivers 103 associated with the abnormal disk d2, the mirror software 102 determines that use of the buffers b2 and b2' is terminated and releases the buffers b2 and b2'.

[Example of Control of Control Device]

Next, an example of control performed by the control device 100 will be described with reference to FIG. 7.

Figure 7:
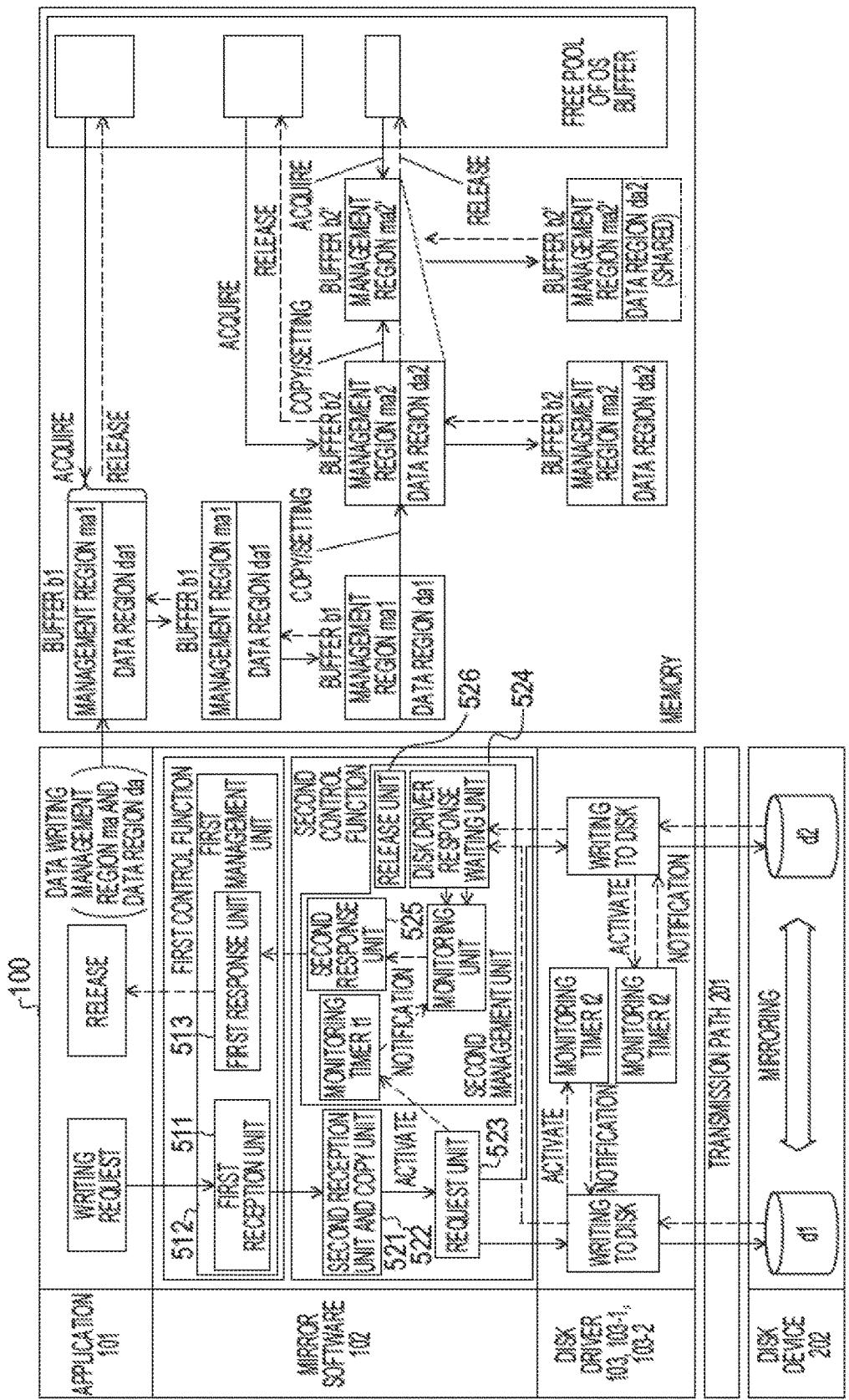
FIG. 7 is a diagram illustrating an example of control performed by a control device, according to an embodiment.
Figure 8A:
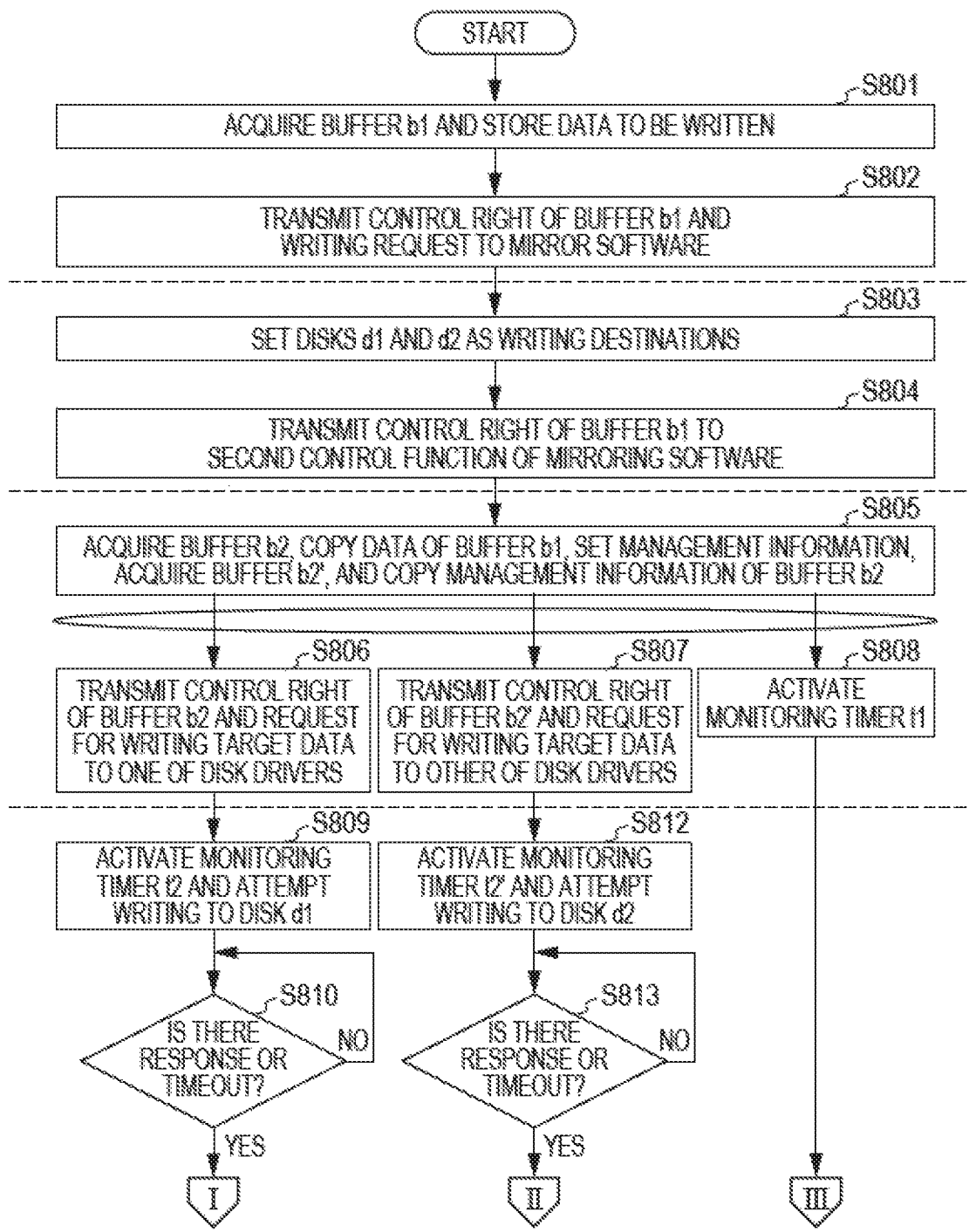

FIG. 7 is a diagram illustrating an example of control performed by the control device 100. A case where the disk device 202 includes the two disks, that is, the disks d1 and d2, will be described in FIG. 7 as an example.

[Writing Request Process of Application 101]

The application 101 acquires the buffer b1 from the OS. The application 101 stores data to be written in the buffer b1, and transmits a request for writing the data to be written stored in the buffer b1 to the mirror software 102 along with the control right of the buffer b1.

[Processes of First Reception Unit 511 and First Management Unit 512 of Mirror Software 102]

Upon receiving the writing request from the application 101 which is in a higher layer, the mirror software 102 checks a state of mirroring with reference to the mirror state management table 400r by using the first control function. Examples of the mirroring state include a first state in which both of the disks are normal and a second state in which one of the disks is abnormal.

Here, when both of the disks which are mirroring targets are normal, the mirror software 102 transmits the control right of the buffer b1 to the second control function, and instructs the second control function to perform writing to both of the disks. On the other hand, when one of the disks is abnormal, the mirror software 102 transmits the control right of the buffer b1 to the second control function, and instructs the second control function to perform writing to the other of the disks which is normal.

[Processes of Second Reception Unit 521, Copy Unit 522, and Request Unit 523 of Mirror Software 102 in First State]

When writing is instructed, the mirror software 102 updates the issued I/O management table 420 and manages information indicating to which one of the disks writing is instructed, by using the second control function. When it is determined, with reference to the issued I/O management table 420, that an instruction for writing to both of the disks is issued, the mirror software 102 acquires the buffers b2 and b2' from the OS by using the second control function. The mirror software 102 copies the data to be written stored in the buffer b1 to the buffer b2 acquired from the OS, and sets management information to the buffer b2.

The mirror software 102 copies, by using the second control function, the management information set in the buffer b2 to the buffer 2' newly acquired from the OS. The mirror software 102 activates the monitoring timer t1. The mirror software 102 transmits the writing request using the buffers b2 and b2' along with the control rights of the buffers b2 and b2', to the disk drivers 103-1 and 103-2.

[Processes of Second Reception Unit 521, Copy Unit 522, and Request Unit 523 of Mirror Software 102 in Second State]

When writing is instructed, the mirror software 102 updates the issued I/O management table 420, by using the second control function, and manages information on a disk to which writing is instructed. When it is determine, with reference to the issued I/O management table 420, that an instruction for writing to one of the disks is issued, the mirror software 102 acquires the buffer b2 from the OS by using the second control function. The mirror software 102 copies the data to be written stored in the buffer b1 to the buffer b2 acquired from the OS, and sets management information to the buffer b2. The mirror software 102 activates the monitoring timer t1. The mirror software 102 transmits the writing request using the buffer b2 along with the control right of the buffer b2, to one of the disk drivers 103 associated with the normal disk.

[Process of Writing to Disks of Disk Drivers 103]

The disk drivers 103-1 and 103-2 respectively associated with the plurality of disks receive a writing request from the mirror software 102 which is in a higher layer. For example, upon receiving a writing request, the disk driver 103-1 performs data writing to a corresponding one of the disks, and monitors an elapsed time by using the monitoring timer t2. Here, when a failure occurs in the disk or the transmission path 201 to the disk and a writing response is not received before the time when the monitoring timer t2 is timed out, the disk driver 103-1 retries the writing until the retry is performed the predetermined number of times.

In the retry, the disk driver 103-1 performs data writing on the disk again, monitors an elapsed time by using the monitoring timer t2, and determines whether writing has been successfully performed before the timeout. When the writing has been successfully performed or a writing response is not received after the writing is retried the predetermined number of times, the disk driver 103-1 transmits a response indicating whether the writing has been successfully performed or not, to the mirror software 102. The disk driver 103-2 performs the same operation as the disk driver 103-1, and therefore, a description thereof is omitted.

[Processes of Second Management Unit 524, Second Response Unit 525, Release Unit 526, and Disk Driver Response Waiting Unit and Monitoring Unit of Second Management Unit 524 in Mirror Software 102 in First State]

When an instruction for writing to both of the disks has been issued, the mirror software 102 receives responses from both of the disk drivers 103 and monitors timeout of the monitoring timer t1, by using the second control function. The mirror software 102 updates the issued I/O management table 420 every time a response is received and manages response states of both of the disk drivers 103.

When responses indicating that the writing has been successfully performed are transmitted from both of the disk drivers 103 before the timeout of the monitoring timer t1, the mirror software 102 transmits a notification indicating that both of the disks are normal, to the first control function, and returns the control right of the buffer b1. At the same time, the mirror software 102 releases the buffers b2 and b2' by using the second control function.

On the other hand, there may be a case where a response indicating that writing has been successfully performed is received from one of the disk drivers 103 and a writing response is not received from the other of the disk drivers 103, before the timeout of the monitoring timer t1 may occur. In this case, the mirror software 102 determines whether the monitoring timer t1 has been timed out by using the second control function. The mirror software 102 continuously waits for a response from one of the disk drivers 103 when the second control function determines that the monitoring timer t1 has not been timed out.

The mirror software 102 transmits a notification indicating that one of the disks is normal and the other of the disks is abnormal, to the first control function, when the timeout is detected by the second control function, and returns the control right of the buffer b1. Here, the mirror software 102 waits for a response from the abnormal disk by using the second control function. Thereafter, when the second control function determines that responses have been received from both of the disk drivers 103, the mirror software 102 releases the buffers b2 and b2' acquired from the OS.

[Processes of First Management Unit 512 and First Response Unit 513 of Mirror Software 102 in First State]

The mirror software 102 receives, by using the first control function, a notification indicating whether the writing has been successfully performed or not, from the second control function, so as to check whether writing to the both of the disks has been successfully performed. The mirror software 102 returns the control right of the buffer b1 along with a response indicating that the writing has been successfully performed, to the application 101 by using the first control function, when the writing to both of the disks has been successfully performed.

When the writing to one of the disks has been successfully performed and the writing to the other of the disks has failed, the mirror software 102 updates, by using the first control function, the mirror state management table 400 and excludes the abnormal disk from mirroring targets. Then the mirror software 102 returns the control right of the buffer b1 along with the response indicating that the writing has been successfully performed, to the application 101, by using the first control function.

[Processes of Second Management Unit 524, Second Response Unit 525, Release Unit 526, and Disk Driver Response Waiting Unit and Monitoring Unit of Second Management Unit 524 in Mirror Software 202 in Second State]

When an instruction for writing to one of the disks is issued, the mirror software 102 receives a response from one of the disk drivers 103 and monitors timeout of the monitoring timer t1, by using the second control function. The mirror software 102 updates the issued I/O management table 420 when receiving the response, and manages a response state of the one of the disk drivers 103.

When a response indicating that the writing has been successfully performed is transmitted from one of the disk drivers 103 before the timeout of the monitoring timer t1, the mirror software 102 transmits, by using the second control function, a notification indicating that one of the disks is normal, to the first control function, and returns the control right of the buffer b1. At this time, the mirror software 102 releases the buffer b2 by using the second control function.

[Processes of First Management Unit 512 and First Response Unit 513 of Mirror Software 102 in Second State]

The mirror software 102 receives, by using the first control function, a notification indicating whether the writing has been successfully performed or not from the second control function, so as to check whether writing to one of the disks has been successfully performed. The mirror software 102 returns, by using the first control function, the control right of the buffer b1 along with a response indicating that the writing has been successfully performed, to the application 101, when the writing to one of the disks has been successfully performed.

[Process of Releasing Application 101]

The application 101 receives a response indicating that the writing has been successfully performed from the mirror software 102, releases the buffer b1 acquired from the OS, and restarts the operation. This allows increase in a response time of the mirror software 102 to a writing request from the application 101 to be suppressed.

[Flows of Various Processes in Control Device 100]

Next, flows of various processes performed by the application 101, the mirror software 102, and the disk drivers 103 included in the control device 100 will be described with reference to FIGS. 8A, 8B, 9, and 10, taking a case where two disks are included in the disk device 202 as an example.

FIGS. 8A, 8B, 9, and 10 are operational flowcharts illustrating the flows of various processes performed in the control device 100. In, FIG. 8A, the application 101 acquires the buffer b1 and writes data to be written therein (step S801). Thereafter, the application 101 transmits a request for writing the data to be written to the disk device 202 including the disks d1 and d2, to the mirror software 102, along with the control right of the buffer b1 (step S802).

The mirror software 102 refers to the mirror state management table 400 and checks a mirroring state by using the first control function. When the mirroring has not been canceled, the two disks d1 and d2 which are mirroring targets are set as writing destinations (step S803). Thereafter, the application 101 transmits, by using the first control function, the control right of the buffer b1 to the second control function of the mirror software 102 (step S804).

The mirror software 102 acquires, by using the second control function, the buffer b2, copies data included in the buffer b1, sets management information, acquires the buffer b2', and copies management information of the buffer b2 (step S805). Subsequently, the mirror software 102 transmits, by using the second control function, a request for writing data to be written (target data) along with the control right of the buffer b2, to the disk driver 103-1 associated with the disk d1 (step S806).

Thereafter, the mirror software 102 transmits a request for writing data to be written (target data) along with the control right of the buffer b2', to the disk driver 103-2 associated with the disk d2, by using the second control function (step S807). Furthermore, the mirror software 102 activates, by using the second control function, the monitoring timer t1 serving as a trigger of a response for suppressing increase in a response time (step S808). Step S806 to step S808 are executed in parallel.

The disk driver 103-1 activates the monitoring timer t2 serving as a trigger for determination of timeout of writing, and attempts writing of data stored in the buffer b2 to the disk d1 (step S809). Subsequently, the disk driver 103-1 determines whether a response from the disk d1 has been detected or the timeout has been detected (step S810).

Here, in a case where the response or the timeout has not been detected (step S810: No), the disk driver 103-1 returns to the process in step S810. On the other hand, in a case where the response or the timeout has been detected (step S810: Yes), the disk driver 103-1 transmits a response indicating whether the writing has been successfully performed or not, that is, a response indicating success or failure of the writing, along with the control right of the buffer b2, to the mirror software 102 (step S811).

The disk driver 103-2 activates the monitoring timer t2' serving as a trigger for determination of timeout of writing and attempts writing of data stored in the buffer b2' to the disk d2 (step S812). Subsequently, the disk driver 103-2 determines whether a response from the disk d2 has been detected or the timeout has been detected (step S813).

Here, in a case where the response and the timeout have not been detected (step S813: No), the disk driver 103-2 returns to the process in step S813. On the other hand, in a case where the response or the timeout has been detected (step S813: Yes), the disk driver 103-2 transmits a response indicating whether the writing has been successfully performed or not, that is, a response indicating success or failure of the writing, along with the control right of the buffer b2', to the mirror software 102 (step S814).

The mirror software 102 receives a response from the disk driver 103-1 by using the second control function (step S815). Furthermore, the mirror software 102 receives a response from the disk driver 103-2 by using the second control function (step S816). Here, the mirror software 102 updates the issued I/O management table 420 every time a response is received so as to manage response states of both of the disk drivers 103. Furthermore, the mirror software 102 waits for the timeout of the monitoring timer t1 serving as a trigger of a response for suppressing increase in a response time, by using the second control function (step S817).

Figure 10:
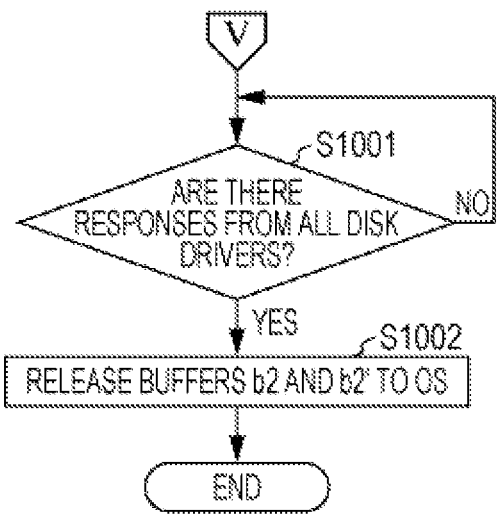
FIG. 10 is a diagram illustrating an example of an operational flowchart for various processes performed by a control device, according to an embodiment.

Here, when the processes in FIGS. 9 and 10 have not been executed when the mirror software 102 receives a response from the disk driver 103-1 or a response from the disk driver 103-2, the mirror software 102 executes the processes in FIGS. 9 and 10 in parallel.

In FIG. 9, the mirror software 102 determines, by using the second control function, whether a response from the disk driver 103-1 or a response from the disk driver 103-2 has been detected (step S901). When any response has not been detected (step S901: No), the mirror software 102 returns to the process in step S901.

On the other hand, when a response has been detected (step S901: Yes), the mirror software 102 determines whether responses from both the disk drivers 103-1 and 103-2 have been received, by using the second control function (step S902). When all the responses have been received (step S902: Yes), the mirror software 102 proceeds to a process in step S903.

In step S903, the mirror software 102 transmits a response indicating that the writing to the respective disks d1 and d2 have been successfully performed (a response indicating success of the writing to the respective disks d1 and d2), along with the control right of the buffer b1, to the first control function, by using the second control function (step S903). Then the mirror software 102 proceeds to the process in step S906.

In a case where a response from one of the disk drivers 103 has not been detected (step S902: No), the mirror software 102 determines whether the monitoring timer t1 serving as a trigger of a response for suppressing increase in a response time has been timed out, by using the second control function (step S904). Here, when the timeout is not detected (step S904: No), the mirror software 102 returns to the process in step S901. On the other hand, when the timeout is detected (step S904: Yes), the mirror software 102 proceeds to a process in step S905.

In step S905, the mirror software 102 transmits a response indicating that writing to one of the disks has been successfully performed (success of the writing to one of the disks) and writing to the other of the disks has failed, to the first control function (failure of the writing to the other of the disks), along with the control right of the buffer b1, by using the second control function (step S905). Then the mirror software 102 proceeds to the process in step S906.

In step S906, the mirror software 102 determines whether one of the disks d1 and d2 has malfunction, by using the first control function (step S906). When the disks d1 and d2 do not have malfunction (step S906: No), the mirror software 102 proceeds to the process in step S908.

On the other hand, when one of the disks d1 and d2 has malfunction (Step S906: Yes), the mirror software 102 updates the mirror state management table 400 and excludes the abnormal disk from mirroring targets, by using the first control function (step S907). Then the mirror software 102 proceeds to the process in step S908.

In step S908, the mirror software 102 transmits a notification indicating that writing has been successfully performed (success of the writing), to the application 101, along with the control right of the buffer b1, by using the first control function (step S908). The application 101 executes post-processing (step S909). Subsequently, the application 101 releases the buffer b1 to the OS (step S910). Then the application 101 restarts the operation (step S911). In this way, the control device 100 terminates the process in FIG. 9 which is executed in parallel with the process in FIG. 10.

In FIG. 10, the mirror software 102 determines whether a response from the disk driver 103-1 and a response from the disk driver 103-2 associated with the disks d1 and d2, respectively, have been received, by using the second control function (step S1001). When at least one of the responses from the disk drivers 103-1 and 103-2 has not been received (step S1001: No), the mirror software 102 returns to the process in step S1001.

On the other hand, all the responses have been received (step S1001: Yes), the mirror software 102 releases the buffers b2 and b2' to the OS, by using the second control function (step S1002). In this way, the control device 100 terminates the process in FIG. 10 which is executed in parallel with the process in FIG. 9. The control device 100 executes the various processes in the control device 100 by performing the process in FIGS. 8A and 8B and performing all the processes in FIGS. 9 and 10 in parallel. By this, increase in a response time of the mirror software 102 to a writing request from the application 101 may be suppressed.

[Procedure of Entire Process of Control Device 100]

Next, an example of a procedure of an entire process of the control device 100 will be described with reference to FIG. 11.

Figure 11:
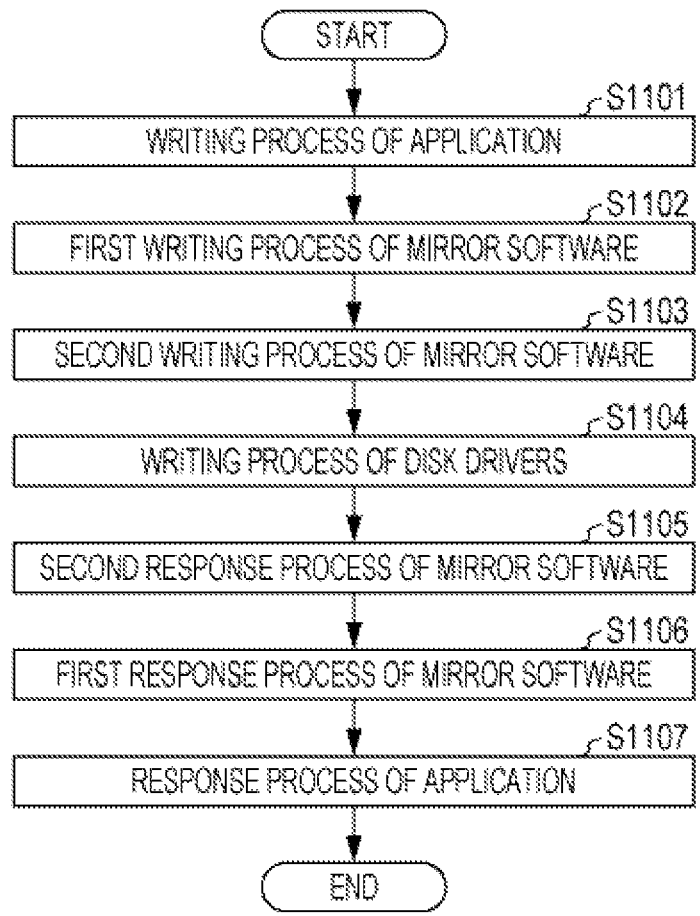
FIG. 11 is a diagram illustrating an example of an operational flowchart for an entire process of a control device, according to an embodiment.

FIG. 11 is an operational flowchart illustrating a procedure of an entire process of the control device 100. In FIG. 11, the control device 100 executes a writing process of the application 101 (step S1101). Subsequently, the control device 100 executes a first writing process of the mirror software 102 (step S1102). Then, the control device 100 executes a second writing process of the mirror software 102 (step S1103).

Thereafter, the control device 100 starts execution of a writing process of the drivers 103 (step S1104). Then the control device 100 starts execution of a release process and an abnormal determination process, in parallel, as a second response process of the mirror software 102 (step S1105).

The control device 100 executes a first response process of the mirror software 102 when at least the abnormal determination process has been terminated (step S1106). Then the control device 100 executes the response process of the application 101 (step S1107), and terminates the entire process. By this, increase in a response time of the mirror software 102 to a writing request from the application 101 may be suppressed.

[Procedure of Writing Process of Application 101]

Next, an example of a procedure of a writing process of the application 101 will be described with reference to FIG. 12.

FIG. 12 is an operational flowchart illustrating a procedure of the writing process performed by the application 101. In FIG. 12, the application 101 acquires the buffer b1 from the OS as a destination of storage of data to be written (step S1201). Subsequently, the application 101 writes the data to be written into the acquired buffer b1 (step S1202).

The application 101 transmits a request for writing the data to be written to the disks, to the mirror software 102, along with the control right of the buffer b1 (step S1203), and terminates the writing process. By this, the application 101 may request the mirror software 102 to write data.

[Procedure of First Writing Process of Mirror Software 102]

Next, an example of a procedure of the first writing process of the mirror software 102 will be described with reference to FIG. 13.

FIG. 13 is an operational flowchart illustrating a procedure of the first writing process performed by the mirror software 102. In FIG. 13, when receiving a writing request from the application 101, the mirror software 102 determines whether mirroring has been canceled with reference to the mirror state management table 400 (step S1301).

Here, when mirroring has not been canceled (step S1301: No), the mirror software 102 sets a plurality of disks serving as mirroring targets as destinations of writing of data to be written, and transmits the setting to a procedure of the second writing process along with the control right of the buffer b1 (step S1302). The mirror software 102 thus terminates the first writing process.

On the other hand, when mirroring has been canceled (step S1301: Yes), the mirror software 102 sets any one of the disks which is determined as having no abnormality as a destination of writing of data to be written, and transmits the setting to the procedure of the second writing process along with the control right of the buffer b1 (step S1303). The mirror software 102 thus terminates the first writing process. By this, the mirror software 102 may determine a data writing destination.

[Procedure of Second Writing Process of Mirror Software 102]

Next, an example of the procedure of the second writing process performed by the mirror software 102 will be described with reference to FIG. 14.

FIG. 14 is an operational flowchart illustrating the procedure of the second writing process performed by the mirror software 102. In FIG. 14, the mirror software 102 determines whether a plurality of disks are set as writing destinations (step S1401).

When a plurality of disks are set as writing destinations (step S1401: Yes), the mirror software 102 acquires the buffer b2 associated with any one of the plurality of disks set as the writing destinations, and acquires the buffer b2' associated with the other of the disks (step S1402). Subsequently, the mirror software 102 copies the data to be written stored in the buffer b1 to the acquired buffer b2, sets management information thereto, and copies the management information stored in the buffer b2 to the acquired buffer b2' (step S1403). Then the mirror software 102 proceeds to a process in step S1406.

On the other hand, when only one disk is set as a writing destination (step S1401: No), the mirror software 102 acquires the buffer b2 (step S1404). Subsequently, the mirror software 102 copies data to be written stored in the buffer b1 to the acquired buffer b2, and sets management information thereto (step S1405). Then the mirror software 102 proceeds to the process in step S1406.

In step S1406, the mirror software 102 activates the monitoring timer t1 serving as a trigger of a response for suppressing increase in a response time (step S1406). Thereafter, the mirror software 102 determines whether a plurality of disks are set as writing destinations (step S1407). When a plurality of the disks are set as writing destinations (step S1407: Yes), the mirror software 102 proceeds to a process in step S1408.

In step S1408, the mirror software 102 transmits the control right of the buffer b2 associated with any one of the plurality of disks set as the writing destinations and the control right of the buffer b2' associated with the other of the disks, to the respective disk drivers 103 associated with the plurality of disks (step S1408). The mirror software 102 thus terminates the second writing process.

On the other hand, when one disk is set as a writing destination (step S1407: No), the mirror software 102 proceeds to a process in step S1409. In step S1409, the mirror software 102 transmits the control right of the buffer b2 to one of the disk drivers 103 associated with one of the disks set as the writing destination (step S1409). The mirror software 102 thus terminates the second writing process. By this, the mirror software 102 may transmit a writing request to the disk drivers 103 without using the buffer b1 acquired by the application 101.

[Procedure of Writing Process of Disk Drivers 103]

Next, an example of a procedure of the writing process performed by the disk drivers 103 will be described with reference to FIG. 15.

Figure 15:
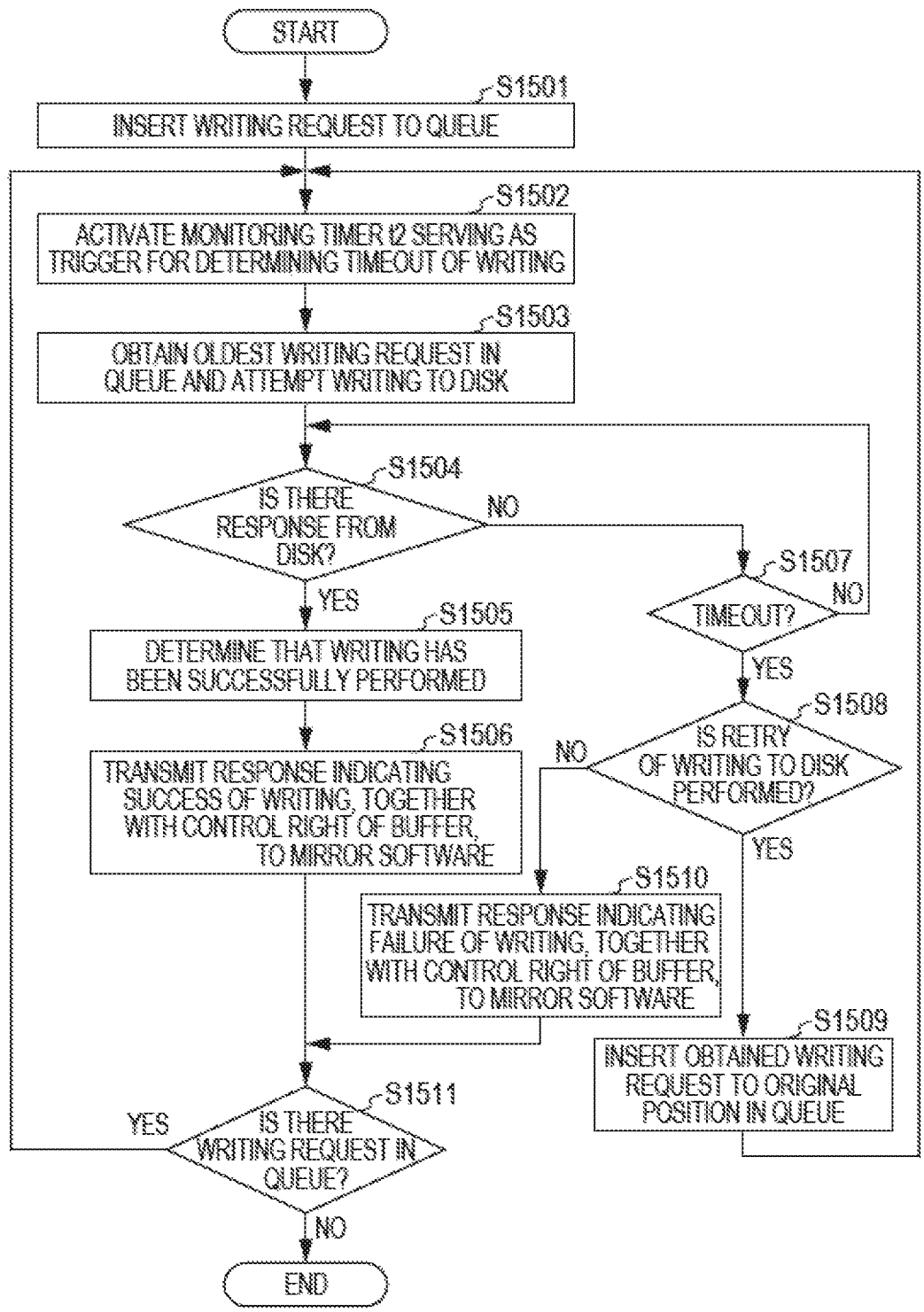
FIG. 15 is a diagram illustrating an example of an operational flowchart for a writing process performed by a disk driver, according to an embodiment.

FIG. 15 is an operational flowchart illustrating a procedure of the writing process performed by one of the disk drivers 103. In FIG. 15, the disk driver 103 adds a writing request to a queue (step S1501). Thereafter, the disk driver activates the monitoring timer t2 serving as a trigger for determination of timeout of writing (step S1502). Then the disk driver 103 extracts the oldest writing request in the queue and attempts writing to the disk (step S1503).

Subsequently, the disk driver 103 determines whether a response from the disk has been received (step S1504). When a response has been received (step S1504: Yes), the disk driver 103 determines that the writing has been successfully performed (step S1505). Thereafter, the disk driver 103 transmits a response indicating that the writing has been successfully performed (success of the writing) to the mirror software 102 along with a control right of a buffer received from the mirror software 102 (step S1506). Then the disk driver 103 proceeds to a process in step S1511.

On the other hand, when a response has not been detected (step S1504: No), the disk driver 103 determines whether the monitoring timer t2 serving as a trigger for determination of timeout of the writing has timed out (step S1507). When the timeout has not been detected (step S1507: No), the disk driver 103 returns to the process in step S1504.

On the other hand, the timeout has been detected (step S1507: Yes), the disk driver 103 determines that the writing to the disk is to be attempted again (step S1508). When the writing is to be attempted again (step S1508: Yes), the disk driver 103 puts the extracted writing request at an original position in the queue (step S1509) and returns to the process in step S1502.

On the other hand, when the writing is not to be attempted again (step S1508: No), the disk driver 103 transmits a response indicating that the writing has failed (failure of the writing), to the mirror software 102, along with the control right of the buffer received from the mirror software 102 (step S1510). Then the disk driver 103 proceeds to a process in step S1511.

In step S1511, the disk driver 103 determines whether a writing request is included in the queue (step S1511). When a writing request is included in the queue (step S1511: Yes), the disk driver 103 returns to the process in step S1502. On the other hand, when a writing request is not included in the queue (step S1511: No), the disk driver 103 terminates the writing process. By this, the disk driver 103 may write data to the disk.

[Procedure of Second Response Process of Mirror Software 102]

Next, an example of a procedure of the second writing process performed by the mirror software 102 will be described with reference to FIGS. 16 and 17.

Figure 16:
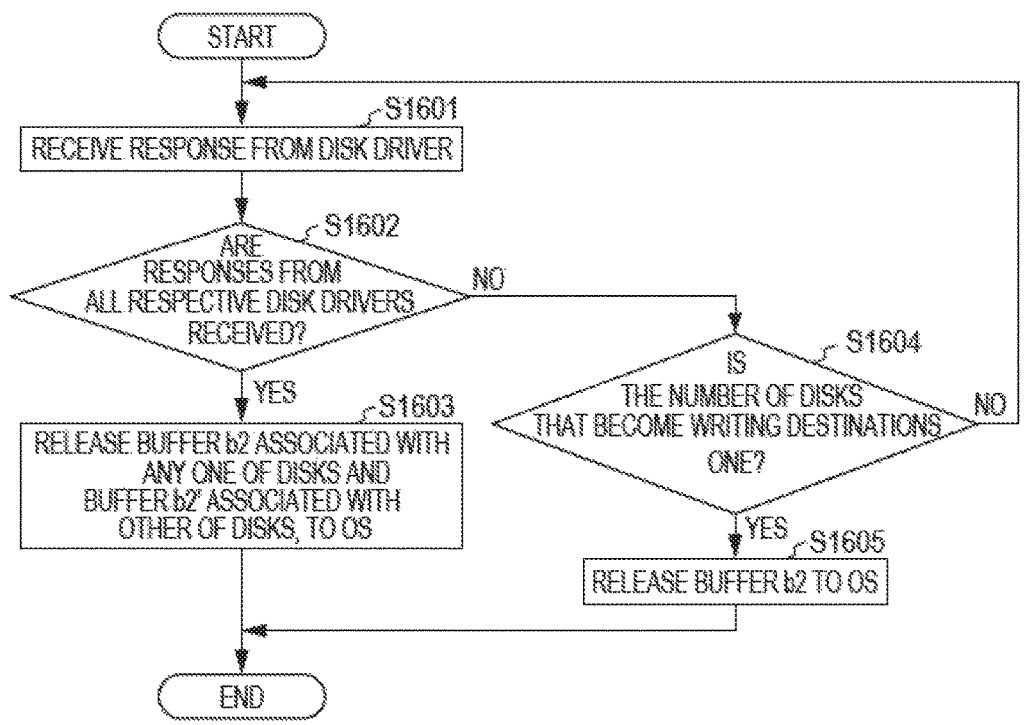
FIG. 16 is a diagram illustrating an example of an operational flowchart for a second response process performed by mirror software, according to an embodiment.
Figure 17:
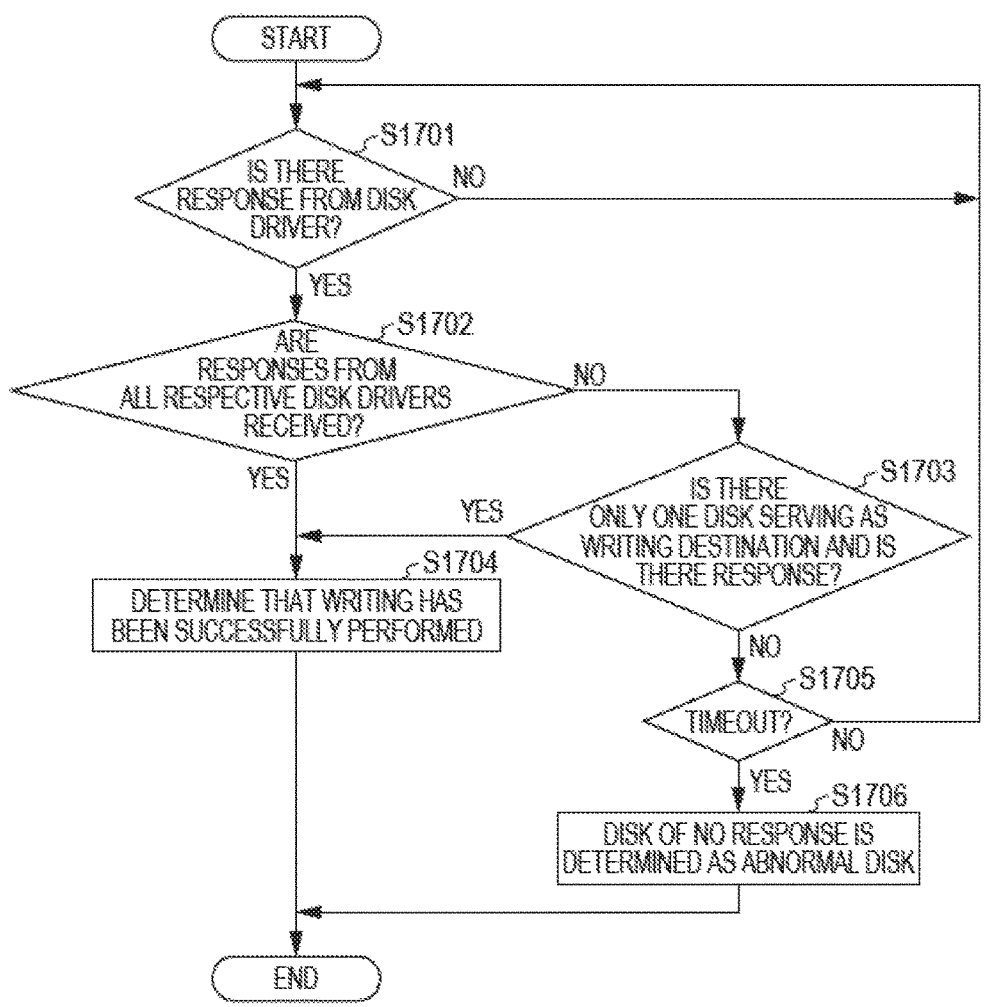
FIG. 17 is a diagram illustrating an example of an operational flowchart for a second response process performed by mirror software, according to an embodiment.

FIGS. 16 and 17 are operational flowcharts illustrating procedures of the second response process performed by the mirror software 102. In FIG. 16, a release process included in the second response process is illustrated. In FIG. 17, an abnormal determination process performed in parallel with the release process in the second response process is illustrated.

In FIG. 16, the mirror software 102 receives a response from one of the disk drivers 103 (step S1601). Here, the mirror software 102 updates the issued I/O management table 420 every time a response is received and manages response states of both of the disk drivers 103. Subsequently, the mirror software 102 determines whether all the respective disk drivers 103 have transmitted responses, with reference to the issued I/O management table 420 (step S1602). When all the respective disk drivers 103 have transmitted responses (step S1602: Yes), the mirror software 102 releases the buffer b2 associated with any one of the plurality of disks and the buffer b2' associated with the other of the disks to the OS (step S1603). The mirror software 102 thus terminates the release process.

On the other hand, when one of the disk drivers 103 has not transmitted a response (step S1602: No), the mirror software 102 determines whether the number of disks that become writing destinations is one (step S1604). When the number is not one (step S1604: No), the mirror software 102 returns to the process in step S1601. On the other hand, when the number is one (step S1604: Yes), the mirror software 102 releases the buffer b2 to the OS (step S1605). The mirror software 102 thus terminates the release process.

In FIG. 17, the mirror software 102 determines whether at least one of the disk drivers 103 has transmitted a response (step S1701). When a response has not been detected (step S1701: No), the mirror software 102 returns to the process in step S1701.

On the other hand, when a response has been detected (step S1701: Yes), the mirror software 102 determines whether all the disk drivers 103 have transmitted responses (step S1702). When all the responses have been detected (step S1702: Yes), the mirror software 102 proceeds to a process in step S1704.

On the other hand, when one of the disk drivers 103 has not transmitted a response (step S1702: No), the mirror software 102 determines whether the number of disks serving as writing destinations is 1 and a response has been received from one of the disk drivers 103 associated with the disk of the writing destination (step S1703). When the number is 1 and the response has been received (step S1703: Yes), the mirror software 102 proceeds to the process in step S1704. In step S1704, the mirror software 102 determines that the writing to the respective disks or the writing to one disk of the writing destination has been successfully performed (step S1704) and terminates the second response process.

On the other hand, when the number is not 1 (step S1703: No), the mirror software 102 determines whether the monitoring timer t1 serving as a trigger of a response for suppressing increase in a response time has been timed out (step S1705). When the timeout has not been detected (step S1705: No), the mirror software 102 returns to the process in step S1701.

On the other hand, when the timeout has been detected (step S1705: Yes), the mirror software 102 determines that the disk from which no-response has been received is an abnormal disk (step S1706), and terminates the second response process. By this, the mirror software 102 may determine whether a disk has malfunction.

[Procedure of First Response Process of Mirror Software 102]

Next, an example of a procedure of the first response process performed by the mirror software 101 will be described with reference to FIG. 18.

Figure 18:
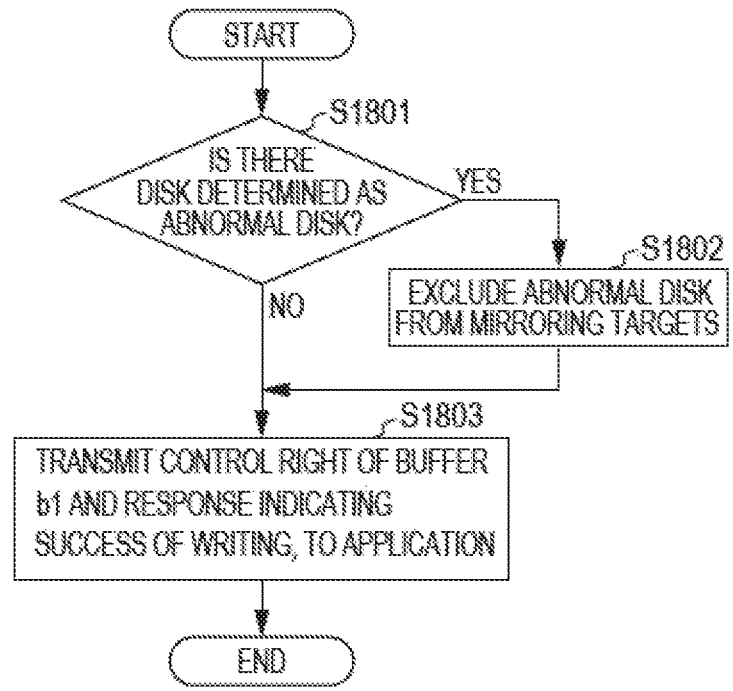
FIG. 18 is a diagram illustrating an example of an operational flowchart for a first response process performed by mirror software, according to an embodiment.

FIG. 18 is a flowchart illustrating a procedure of a first response process performed by the mirror software 102. In FIG. 18, the mirror software 102 determines whether at least one of the plurality of disks serving as mirroring targets has malfunction (step S1801). When the disks do not have malfunction (step S1801: No), the mirror software 102 proceeds to a process in step S1803.

On the other hand, when one of the disks has malfunction (Step S1801: Yes), the mirror software 102 updates the mirror state management table 400 and excludes the abnormal disk from mirroring targets (step S1802). Then the mirror software 102 proceeds to the process in step S1803.

In step S1803, the mirror software 102 transmits a response indicating that the writing has been successfully performed (success of the writing) to the application 101, along with the control right of the buffer b1 (step S1803).

The mirror software 102 thus terminates the first response process. By this, the mirror software 102 may respond to the application 101 while excluding a disk which may have malfunction, if any, from mirroring targets.

[Procedure of Response Process of Application 101]

Next, an example of a procedure of the response process performed by the application 101 will be described with reference to FIG. 19.

Figure 19:
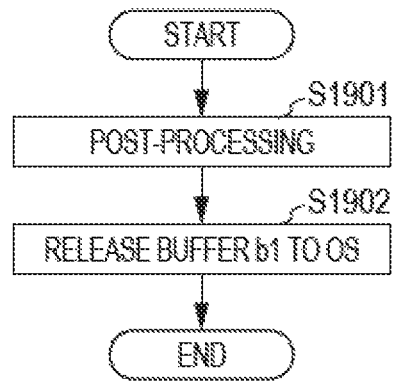
FIG. 19 is a diagram illustrating an example of an operational flowchart for a response process performed by an application, according to an embodiment.

FIG. 19 is an operational flowchart illustrating a procedure of the response process performed by the application 101. In FIG. 19, the application 101 executes post-processing (step S1901). Subsequently, the application 101 releases the buffer b1 to the OS (step S1902). Then the application 101 terminates the response process. By this, the application 101 may restart the operation.

As described above, according to the control device 100, a request for writing data to be written stored in the buffer b1 acquired by the application 101 may be received from the application 101, and the buffers b2 and b2' which are different from the buffer b1 may be acquired. Furthermore, according to the control device 100, data to be written stored in the buffer b1 may be copied to the acquired buffer b2, management information may be set thereto, and the management information stored in the buffer b2 may be copied to the secured buffer b2'. Moreover, according to the control device 100, a request for writing data to be written stored in the buffer b2 may be transmitted to one of the drivers 103 associated with one of the disks, along with the control right of the buffer b2. Furthermore, according to the control device 100, a request for writing data to be written copied to the buffer b2 may be transmitted to the other of the disk drivers 103, along with the control right of the buffer b2' which is acquired for the other of the disk drivers 103. By this, the control device 100 may transmit a request for writing data to be written to the plurality of drivers 103 without using the buffer b1, and may respond to the application 101 even if the drivers 103 are attempting writing to the disks.

Furthermore, according to the control device 100, it may be detected that a predetermined period of time has elapsed after a request for writing data to be written is transmitted to the drivers 103 and before retry-over of data writing processes by the drivers 103 is reached. According to the control device 100, in a case where a response indicating that writing has been successfully performed on at least one of the disks is detected before the detection of the predetermined period of time, a response indicating that the writing has been successfully performed may be supplied to the application 101. According to the control device 100, in a case where a response indicating that the writing has been successfully performed on at least one of the disks is detected before the detection of the predetermined period of time, the other one of the disks which has not issued a writing response may be excluded from mirroring targets. Accordingly, the control device 100 may excludes a disk which may have malfunction from mirroring targets so that data consistency is maintained.

Accordingly, the mirror software 102 may respond to the application 101 without waiting for responses from the plurality of drivers 103, and suppress increase in a response time. Furthermore, the mirror software 102 may avoid reading of data from the disks d1 and d2 which may have malfunction when receiving a data reading request or the like from the application 101.

According to the control device 100, in a case where responses indicating that writing has been successfully performed on the respective disks are received before the predetermined period of time has elapsed after a writing request is transmitted to the drivers 103, a response indicating that the writing has been successfully performed may be transmitted to the application 101. By this, the control device 100 may respond to the application 101 without waiting for elapse of the predetermined period of time after transmitting a writing request, when the plurality of disks are normal and the writing has been successfully performed.

Furthermore, according to the control device 100, in a case where the responses of writing to the respective disks are received, the buffers b2 and b2' may be released. By this, the control device 100 does not maintain the securing of the buffers b2 and b2' but may release the buffers b2 and b2' so as to return the buffers b2 and b2' to the OS even after excluding a disk from mirroring targets or even after responding to the application 101, and accordingly, exhaustion of storage capacity of the free pool of the OS may be avoided.

According to the control device 100, a period of time which is shorter than a period of time from when the drivers 103 receive a data writing request to when it is determined that writing to the disks has failed (retry-over) may be used as the predetermined period of time. By this, even if responses indicating whether the writing has been successfully performed or not are not yet transmitted from the drivers 103, the control device 100 may determine that a disk, which has not issued a response indicating whether the writing has been successfully performed or not when the predetermined period of time has elapsed, has a potential for failure. Furthermore, the control device 100 may determine that even a disk, for which an associated one of the drivers 103 has transmitted a response indicating that the writing has been successfully performed, is also an unstable disk to which data writing was attempted by the associated one of the drivers 103 a plurality of times and intermittent failure may occur in the disk.

Note that the control method described in the foregoing embodiment may be realized by executing a program provided in advance using a computer, such as a personal computer or a work station. This control program is recorded in a computer readable recording medium, such as a hard disk, a flexible disk, a CD-ROM, an MO or a DVD, and executed after being read from the recording medium by the computer. This control program may be delivered through a network, such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process comprising:

upon receiving, from application software, a first request for writing data stored in a first storage region acquired by the application software, acquiring a second storage region which is different from the first storage region;

copying the data to the acquired second storage region;

transmitting, to one of drivers associated with each of redundant storage devices on which mirroring is to be performed, a second request for writing the copied data to the each first storage device, each of the drivers being configured to perform a data writing process of writing the data into one of the redundant storage devices associated with the each driver; and transmitting, to the application software, a first response indicating that writing of the data has been successfully performed in a case where a second response indicating that the data writing process of writing the data into at least one of the redundant storage devices is completed is detected when a predetermined period of time has elapsed after the second request for writing the copied data is transmitted to the at least one of the drivers and before a retry-over time at which retry of the data writing process is performed predetermined times by at least one of the drivers, and excluding, from the redundant storage devices, a storage device for which the second response indicating that the data writing process is completed is not detected.

2. The non-transitory, computer-readable recording medium of claim 1, wherein
the process further includes releasing the second storage region in a case where the second responses are detected for the redundant storage devices, respectively.

3. The non-transitory, computer-readable recording medium of claim 1, wherein
the process further includes, when there exists at least one of the redundant storage devices for which the second response is not detected, releasing the second storage region after the second responses are detected for the redundant storage devices, respectively.

4. The non-transitory, computer-readable recording medium of claim 2, wherein
the predetermined period of time is set at a value shorter than a period of time from a time at which each of the drivers receives the second request to the retry-over time for the each driver.

5. A method comprising:
upon receiving, from application software, a first request for writing data stored in a first storage region acquired by the application software, acquiring a second storage region which is different from the first storage region;
copying the data to the acquired second storage region;
transmitting, to one of drivers associated with each of redundant storage devices on which mirroring is to be performed, a second request for writing the copied data to the each redundant storage device, each of the drivers being configured to perform a data writing process of writing the data into one of the redundant storage devices associated with the each driver; and
transmitting, to the application software, a first response indicating that writing of the data has been successfully performed in a case where a second response indicating that the data writing process of writing the data into at least one of the redundant storage devices is completed is detected when a predetermined period of time has elapsed after the second request for writing the copied data is transmitted to the at least one of the drivers and before a retry-over time at which retry of the data writing process is performed predetermined times by at least one of the drivers, and excluding, from the redundant storage devices, a storage device for which the second response indicating that the data writing process is completed is not detected.

6. An apparatus comprising:
a processor configured to:
upon receiving, from application software, a first request for writing data stored in a first storage region acquired by the application software, acquire a second storage region which is different from the first storage region;
copy the data to the acquired second storage region,
transmit, to one of drivers associated with each of redundant storage devices on which mirroring is to be performed, a second request for writing the copied data to the each first storage device, each of the drivers being configured to perform a data writing process of writing the data into one of the redundant storage devices associated with the each driver, and
transmit, to the application software, a first response indicating that writing of the data has been successfully performed in a case where a second response indicating that the data writing process of writing the data into at least one of the redundant storage devices is completed is detected when a predetermined period of time has elapsed after the second request for writing the copied data is transmitted to the at least one of the drivers and before a retry-over time at which retry of the data writing process is performed predetermined time by at least one of the drivers s, and exclude, from the redundant storage devices, a storage device for which the second response indicating that the data writing process is completed is not detected; and
a memory coupled to the processor and configured to include the second storage region.

* * * * *